US011400769B2

(12) United States Patent
Ohta

(10) Patent No.: US 11,400,769 B2
(45) Date of Patent: *Aug. 2, 2022

(54) TIRE

(71) Applicant: Toyo Tire Corporation, Itami (JP)

(72) Inventor: Kazuki Ohta, Itami (JP)

(73) Assignee: Toyo Tire Corporation, Itami (JP)

( * ) Notice: Subject to any disclaimer, the term of this patent is extended or adjusted under 35 U.S.C. 154(b) by 17 days.

This patent is subject to a terminal disclaimer.

(21) Appl. No.: 16/902,592

(22) Filed: Jun. 16, 2020

(65) Prior Publication Data

US 2020/0398616 A1    Dec. 24, 2020

(30) Foreign Application Priority Data

Jun. 19, 2019    (JP) .............................. JP2019-113996

(51) Int. Cl.
*B60C 15/06*    (2006.01)
*B60C 23/00*    (2006.01)
(Continued)

(52) U.S. Cl.
CPC ................ *B60C 19/00* (2013.01); *B60C 9/02* (2013.01); *B60C 2009/0223* (2013.01); *B60C 2015/0617* (2013.01); *B60C 2019/004* (2013.01)

(58) Field of Classification Search
CPC .......... B60C 9/1835; B60C 2009/1842; B60C 2009/1871; B60C 2009/1878;
(Continued)

(56) References Cited

U.S. PATENT DOCUMENTS 5,196,077 A    3/1993    Kaga
6,921,197 B2*  7/2005    Aubel ................. B60C 23/0493
                                                                374/120
(Continued)

FOREIGN PATENT DOCUMENTS

CN    101279574 A    10/2008
CN    101734112 A    6/2010
(Continued)

OTHER PUBLICATIONS

Extended European Search Report dated Jan. 28, 2020, in connection with corresponding European Application No. 19200343.2; 5 pages.
(Continued)

*Primary Examiner* — Justin R Fischer
(74) *Attorney, Agent, or Firm* — Maier & Maier, PLLC

(57) ABSTRACT

A tire includes tire frame members including bead cores, a bead filler, an inner liner, side-wall rubber and cushion rubber; and an electronic unit provided at an interface of tire frame members, the tire further including: a carcass ply which extends from one bead core to another bead core and includes a rubber-coated reinforcement cord, a belt disposed on the outer side in the tire-radial direction of the carcass ply, in which the cushion rubber is disposed at an end of the carcass ply or at an end of the belt, in which the side-wall rubber is disposed on an outer side in a tire-width direction of the cushion rubber, and in which the electronic unit is disposed between the cushion rubber, and the bead filler or the side-wall rubber.

6 Claims, 15 Drawing Sheets

(51) Int. Cl.
*B60C 19/00* (2006.01)
*B60C 9/02* (2006.01)

(58) Field of Classification Search
CPC . B60C 15/06; B60C 15/0603; B60C 15/0607; B60C 2015/0614; B60C 2015/0617; B60C 2015/0621; B60C 2015/061; B60C 2015/0625
See application file for complete search history.

(56) References Cited

U.S. PATENT DOCUMENTS

| | | | | |
|---|---|---|---|---|
| 7,036,541 | B2* | 5/2006 | Maruoka | B60C 9/18 152/209.14 |
| 8,905,102 | B2* | 12/2014 | Nishio | B60C 15/0009 152/540 |
| 2005/0257868 | A1 | 11/2005 | Adamson | |
| 2006/0000199 | A1* | 1/2006 | Domingo | B60C 15/0607 57/237 |
| 2008/0289736 | A1 | 11/2008 | Adamson et al. | |
| 2010/0123584 | A1 | 5/2010 | Lionetti et al. | |
| 2011/0175778 | A1 | 7/2011 | Myatt | |
| 2012/0318427 | A1 | 12/2012 | Nishio | |
| 2016/0107490 | A1 | 4/2016 | Randall et al. | |
| 2016/0114633 | A1* | 4/2016 | Miyasaka | C08L 7/02 152/542 |
| 2016/0236521 | A1 | 8/2016 | Yukawa | |
| 2016/0303921 | A1 | 10/2016 | Miklic et al. | |
| 2019/0322142 | A1 | 10/2019 | Lallement et al. | |
| 2020/0079159 | A1 | 3/2020 | Destraves et al. | |
| 2020/0247193 | A1* | 8/2020 | Nakajima | B60C 19/00 |

FOREIGN PATENT DOCUMENTS

| | | |
|---|---|---|
| CN | 105813863 A | 7/2016 |
| EP | 2524818 A2 | 11/2012 |
| EP | 3196056 A1 | 7/2017 |
| EP | 3315322 A1 | 5/2018 |
| FR | 3059603 A1 | 6/2018 |
| JP | 200252909 A | 2/2002 |
| JP | 2005-335384 A | 12/2005 |
| JP | 2008265750 A | 11/2008 |
| JP | 2011105076 A | 6/2011 |
| JP | 201296727 A | 5/2012 |
| JP | 2012106531 A | 6/2012 |
| JP | 20131223 A | 1/2013 |
| JP | 201637235 A | 3/2016 |
| JP | 201637236 A | 3/2016 |
| JP | 201649920 A | 4/2016 |
| JP | 2016539047 A | 12/2016 |
| JP | 2017222294 A | 12/2017 |
| JP | 2017537013 A | 12/2017 |
| WO | WO 03/105509 * | 12/2003 |
| WO | 2011002440 A1 | 1/2011 |
| WO | 2015088890 A1 | 6/2015 |
| WO | 2018104623 A1 | 6/2018 |

OTHER PUBLICATIONS

Office Action dated Jun. 4, 2019, in connection with corresponding Japanese Application No. 2018-188134 (7 pp., including machine-generated English translation).

Office Action dated Aug. 27, 2019, in connection with corresponding Japanese Application No. 2018-188134 (4 pp., including machine-generated English translation).

Office Action dated May 21, 2021, in connection with corresponding U.S. Appl. No. 16/589,759; 11 pages.

Office Action dated Feb. 2, 2021, in connection with corresponding U.S. Appl. No. 16/589,756; 14 pages.

Office Action dated Oct. 22, 2020, in connection with corresponding U.S. Appl. No. 16/589,756; 17 pages.

* cited by examiner

TIRE

CROSS-REFERENCE TO RELATED APPLICATIONS

This application is based on and claims the benefit of priority from Japanese Patent Application No. 2019-113996, filed on 19 Jun. 2019, the content of which is incorporated herein by reference.

FIELD

The present invention relates to a tire in which an electronic unit is embedded.

BACKGROUND

Conventionally, tires in which an electric component such as an RFID is embedded within the rubber structure have been known. With such tires, by an RFID tag embedded in the tire and a reader as an external device carrying out communication, it is possible to perform production control of tires, usage history management, etc. For example, Japanese Unexamined Patent Application, Publication No. 2005-335384 discloses a tire arranging a patch assembled with an electronic unit having an antenna at a portion adjacent to the inner liner. In addition, it shows that it is also possible to arrange the electronic unit between a carcass and side wall, or between a carcass and tread portion.

SUMMARY

In the technology shown in Japanese Unexamined Patent Application, Publication No. 2005-335384, in the case of arranging the electronic unit between the carcass and side wall, for example, since the physical properties of the carcass and side wall greatly differ, there is a possibility of relative motion generated between both members during vulcanization and during use due to the difference in these physical properties, e.g., differences in linear expansion coefficient and elastic modulus, and thus the electronic unit receiving stress. Then, if exceeding an allowed stress, there is a possibility of the electronic unit no longer maintaining the function thereof. In addition, in the case of arranging the electronic unit by configuring so as to sandwich simply between two rubber members, it will be difficult to establish a reference for the arrangement position thereof, and there is a possibility of the arrangement position of the electronic unit varying. As a result thereof, there is also a possibility of the electronic unit being arranged at an unpreferable position from an aspect of stress, distortion or the like, and no longer maintaining the function thereof.

The present invention has been made taking account of the above situation, and an object thereof is to provide a tire in which an embedded electronic unit can maintain the function thereof.

A tire according to a first aspect of the present invention includes: tire frame members including bead cores, a bead filler, an inner liner, side-wall rubber and cushion rubber; and an electronic unit provided at an interface of tire frame members, the tire further including: a carcass ply which extends from one bead core to another bead core and includes a rubber-coated reinforcement cord, a belt disposed on the outer side in the tire-radial direction of the carcass ply, in which the cushion rubber is disposed at an end of the carcass ply or at an end of the belt, in which the side-wall rubber is disposed on an outer side in a tire-width direction of the cushion rubber, and in which the electronic unit is disposed between the cushion rubber, and the bead filler or the side-wall rubber.

According to the present invention, it is possible to provide a tire in which an embedded electronic unit can maintain the function thereof.

DETAILED DESCRIPTION

First Embodiment

Figure 1:
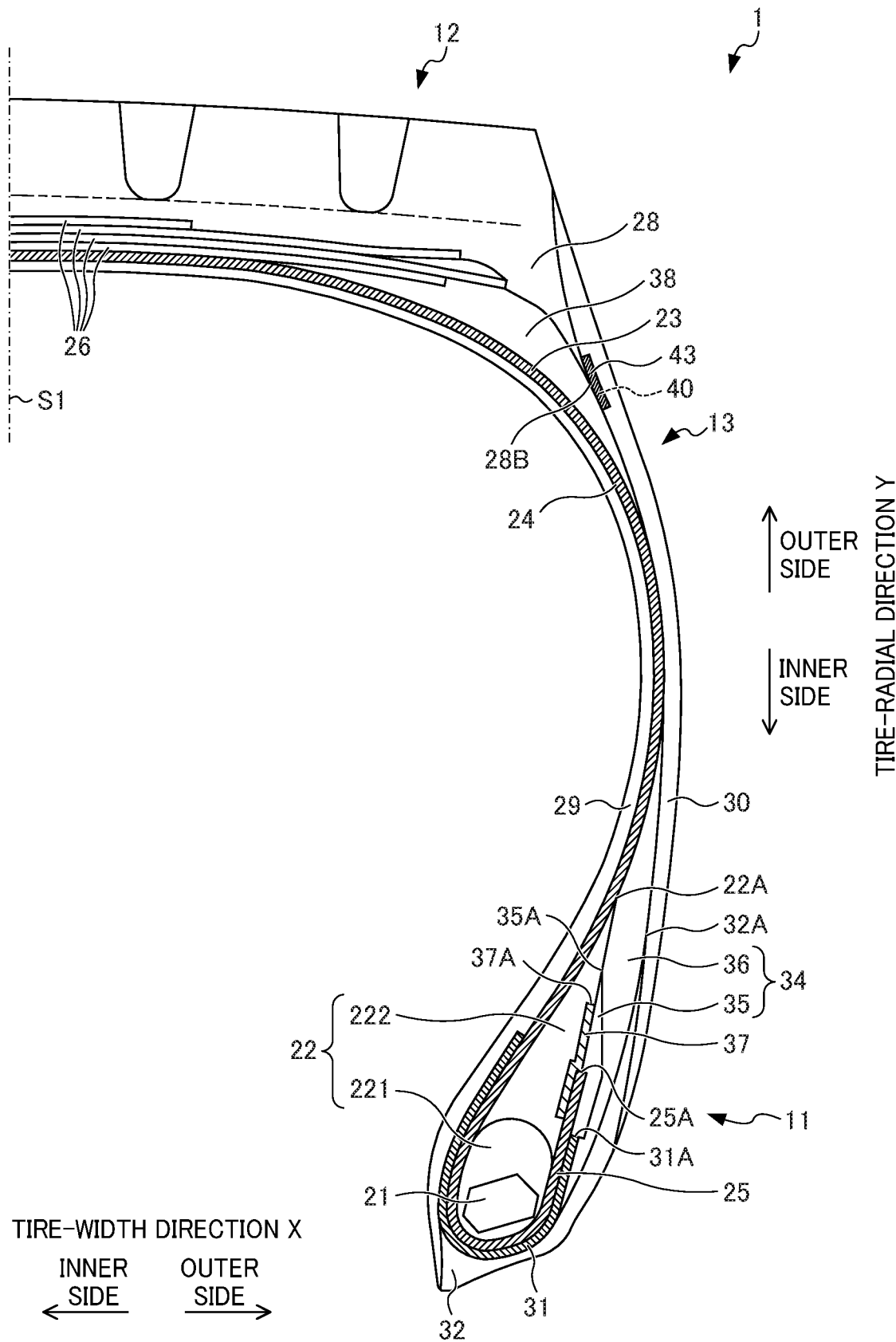
FIG. 1 is a view showing a half section in a tire-width direction of a tire according to a first embodiment of the present invention.

Hereinafter, a first embodiment of the present invention will be explained while referencing the drawings. FIG. 1 is a view showing a half section in a tire-width direction of a tire 1 according to the present embodiment. The basic structure of the tire is left/right symmetric in the cross section of the tire-width direction; therefore, a cross-sectional view of the right half is shown herein. In the drawings, the reference symbol S1 is the tire equatorial plane. The tire equatorial plane S1 is a plane orthogonal to the tire rotation axis, and is positioned in the center of the tire-width direction. Herein, tire-width direction is a direction parallel to the tire rotation axis, and is the left/right direction of the paper plane of the cross-sectional view in FIG. 1. In FIG. 1, it is illustrated as the tire-width direction X. Then, inner-side of tire-width direction is a direction approaching the tire equatorial plane S1, and is the left side of the paper plane in FIG. 1. Outer side of tire-width direction is a direction distancing from the tire equatorial plane S1, and is the right side of the paper plane in FIG. 1. In addition, tire-radial direction is a direction perpendicular to the tire rotation axis, and is the vertical direction in the paper plane of FIG. 1. In FIG. 1, it is illustrated as the tire-radial direction Y. Then, outer-side of tire-radial direction is a direction distancing from the tire rotation axis, and is the upper side of the paper plane in FIG. 1. Inner-side of tire-radial direction is a direction approaching the tire rotation axis, and is the lower side of the paper plane in FIG. 1. The same also applies to FIGS. 2, 5 to 7, 9 to 11, and 13.

The tire 1 is a tire for trucks and buses, for example, and includes a pair of beads 11 provided at both sides in the tire width direction, tread 12 forming a contact patch with the road surface, and a pair of sidewalls 13 which extends between the pair of beads and the tread 12.

The bead 11 includes an annular bead core 21 formed by wrapping around several times bead wires made of metal coated with rubber, and a bead filler 22 of tapered shape extending to the outer side in the tire-radial direction of the bead core 21. The bead filler 22 is configured by a first bead filler 221 which covers the outer circumference of the bead core 21, and a second bead filler 222 which is arranged on the outer side in the tire-radial direction of the first bead filler 221. The second bead filler 222 is configured from rubber with a modulus higher than an inner liner 29 and side wall rubber 30 described later. Then, the first bead filler 221 is configured from rubber of an even higher modulus than the second bead filler 222. It should be noted that the first bead filler 221 may be a form not covering the outer circumference of the bead core 21, if at least a part thereof is arranged on the outer side in the tire-radial direction of the bead core 21. In addition, the bead filler 22 may be formed from rubber of one type. In other words, it may not necessarily be divided into the first bead filler 221 and second bead filler 222. The bead core 21 is a member which plays a role of fixing a tire filled with air to the rim of a wheel which is not illustrated. The bead filler 22 is a member provided in order to raise the rigidity of the bead peripheral part and to ensure high maneuverability and stability.

A carcass ply 23 constituting a ply serving as the skeleton of the tire is embedded inside of the tire 1. The carcass ply 23 extends from one bead core to the other bead core. In other words, it is embedded in the tire 1 between the pair of bead cores 21, in a form passing through the pair of side walls 13 and the tread 12. As shown in FIG. 1, the carcass ply 23 includes a ply body 24 which extends from one bead core to the other bead core, and extends between the tread 12 and bead 11, and a ply folding part 25 which is folded around the bead core 21. Herein, a folding end 25A of the ply folding part 25 is positioned more to an inner side in the tire-radial direction than a tire-radial direction outside end 22A of the bead filler 22. The carcass ply 23 is configured by a plurality of ply cords extending in a tire-width direction. In addition, a plurality of ply cords is arranged side by side in a tire circumferential direction. This ply cord as a reinforcement cord is configured by a metal steel cord, or an insulated organic fiber cord such as polyester or polyamide, or the like, and is covered by rubber.

In the tread 12, a plurality of layers of steel belts 26 is provided in the outer side in the tire radial direction of the carcass ply 23. The steel belt 26 is a belt configured by a plurality of steel cords covered by rubber. By providing the steel belts 26, the rigidity of the tire is ensured, and the contact state of the road surface with the tread 12 improves. In the present embodiment, although four layers of steel belts 26 are provided, the number of layered steel belt 26 is not limited thereto.

The tread rubber 28 is provided at the outer side in the tire-radial direction of the steel belt 26. A tread pattern (not illustrated) is provided to the outer surface of the tread rubber 28, and this outer surface serves as a contact surface which contacts with the road surface.

In the vicinity of the outer side in the tire-width direction of the tread 12, i.e. in an end region on the tire-width direction of the steel belt 26 and tread rubber 28, in a region between the carcass ply 23, and the steel belts 26/tread rubber 28, a shoulder pad 38 is provided as a pad. This shoulder pad 38 extends until a region of the outer side in the tire-radial direction of the side wall 13, and part thereof forms an interface between side wall rubber 30 described later. In other words, in the region of the outer side in the tire-radial direction of the side wall 13, a part of the shoulder pad 38 is present on the inner side in the tire width direction of the side wall rubber 30. In other words, in an extended part of the shoulder pad 37, from the tire inner cavity side towards the outer surface side of the tire, the extended part of the shoulder pad 38 and the side wall rubber 30 are laminated in order on the carcass ply 23. In other words, at part of the carcass ply 23, the shoulder pad 38 and side-wall rubber 30 are laminated. The shoulder pad 38 as cushion rubber consists of a rubber member having cushioning, and exhibits a cushion function between the carcass ply 23 and steel belt 26. In addition, since the shoulder pad 38 consists of rubber having a characteristic of low heat buildup, it is possible to suppress heat generation effectively, by extending until the side wall 13. In this way, the shoulder pad 38 is arranged at a tire surface side of the carcass ply 23, and at a tire inner cavity side of the tread rubber 28 and side wall rubber 30.

In the bead 11, side wall 13 and tread 12, an inner liner 29 serving as a rubber layer constituting an inside wall surface of the tire 1 is provided to a tire inner cavity side of the carcass ply 23. The inner liner 29 is configured by air permeation resistant rubber, whereby the air inside the tire inner cavity is prevented from leaking to outside.

In the side wall 13, the side wall rubber 30 constituting the outer wall surface of the tire 1 is provided to the outer side in the tire-width direction of the carcass ply 23. This side wall rubber 30 is a portion which bends the most upon the tire exhibiting a cushioning action, and usually flexible rubber having fatigue resistance is adopted therein.

On the inner side in the tire radial direction of the carcass ply 23 provided around the bead core 21 of the bead 11, a steel chafer 31 serving as a reinforcement ply is provided so as to cover at least part of the carcass ply 23. The steel chafer 31 also extends to the outer side in the tire-width direction of the ply folding part 25 of the carcass ply 23, and an end part 31A of this steel chafer 31 is positioned more to the inner side in the tire-radial direction than the folding end 25A of the carcass ply 23. This steel chafer 31 is a metal reinforcement layer configured by metal steel cords, and is covered by rubber.

Rim strip rubber 32 is provided at the inner side in the tire-radial direction of the steel chafer 31. This rim strip rubber 32 is arranged along the outer surface of the tire, and connects with the side wall rubber 30. This rim strip rubber 32 and side wall rubber 30 are rubber members constituting the outer surface of the tire.

Then, at the outer side in the tire-radial direction of the end part 31A of the steel chafer 31, which is at the outer side in the tire-width direction of the folding part 25 of the carcass ply 23 and bead filler 22, a first pad 35 is provided. This first pad is provided at the outer side in the tire-width direction of at least the folding end 25A of the carcass ply 23. The outer side in the tire-radial direction of the first pad 35 is formed so as to taper as approaching the outer side in the tire-radial direction.

Furthermore, a second pad 36 is provided so as to cover the outer side in the tire-width direction of the first pad 35. In more detail, the second pad 36 is provided so as to cover the outer side in the tire-width direction of part of the steel chafer 31, the first pad 35, part of the second bead filler 222, and part of the ply body 24 of the carcass ply 23. Then, the side wall rubber 30 is arranged at an outer side in the tire-width direction in a tire-radial direction outside region of the second pad 36, and the rim strip rubber 32 is arranged at an outer side in the tire-width direction in a tire-radial direction inside region of the second pad 36. In other words, the second pad 36 is provided between the first pad 35, etc., and the rim strip rubber 32 and side wall rubber 30, which are members constituting the outer surface of the tire.

The first pad 35 and second pad 36 as the cushion rubber constitute the pad member 34, and this pad member 34 is configured from rubber of a higher modulus than the modulus of the tire-radial direction outside portion (second bead filler 222) of the bead filler 22). In more detail, the second pad 36 is configured by rubber of higher modulus than the second bead filler 222, and the first pad 35 is configured by rubber of even higher modulus than the second pad 36. The first pad 35 as a first cushion rubber and second pad 36 as a second cushion rubber have a function of mitigating sudden distortion caused by the local rigidity point of change at the folding end 25A of the carcass ply 23 and the end part 31A of the steel chafer 31.

The rubber sheet 37 serving as an annular-shaped sheet is arranged in the vicinity of the folding end 25A of the carcass ply 23, between the bead filler 22 and pad member 34. The rubber sheet 37 is arranged so as to cover the folding end 25A of the carcass ply 23 from the inner side in the tire-width direction. The rubber sheet 37 is configured from rubber of higher modulus than the second bead filler 222. More preferably, it is configured from rubber of a modulus substantially equal to that of the first pad 35.

Generally, at the folding end 25A of the carcass ply 23, stress tends to concentrate. However, by providing the rubber sheet 37 serving as the aforementioned reinforced rubber sheet, it becomes possible to effectively suppress the concentration of stress. It should be noted that, although the pad member 34 is configured from the first pad 35 and second pad 36 in the present embodiment, the pad member 34 may be configured from one member. However, as mentioned above, by configuring the pad member 34 from the first pad 35 and second pad 36, and further adopting a configuration arranging the rubber sheet 37, it is possible to more effectively suppress the concentration of stress.

It should be noted that the position of the tire-radial direction outside end 37A of the rubber sheet in the present embodiment is located more to the outer side in the tire-radial direction than the tire-radial direction outside end 22A of the bead filler 22. However, the position of the tire-radial direction outside end 37A of the rubber sheet 37 may be made to substantially match the position of the tire-radial direction outside end 22A of the bead filler 22. It should be noted that the rubber sheet 37 preferably adopts a form arranged so as to cover the folding end 25A of the carcass ply 23 from the inner side in the tire-width direction as shown in FIG. 1; however, a configuration covering the folding end 25A of the carcass ply 23 from the outer side in the tire-width direction may be adopted. Even in this case, it is possible to mitigate the concentration of stress.

An RFID tag 40 is embedded as an electrical unit in the tire 1 of the present embodiment. The RFID tag 40 is a passive transponder equipped with an RFID chip and an antenna for performing communication with external equipment, and performs wireless communication with a reader (not illustrated) serving as the external equipment. As the antenna, a coil-shaped spring antenna, plate-shaped antenna, and various types of rod-shaped antennas can be used. For example, it may be an antenna formed by printing a predetermined pattern on a flexible substrate. The antenna is established at an antenna length optimized according to the frequency band, etc. to be used. In a storage part inside the RFID chip, identification information such as a manufacturing number and part number is stored.

Figure 2:
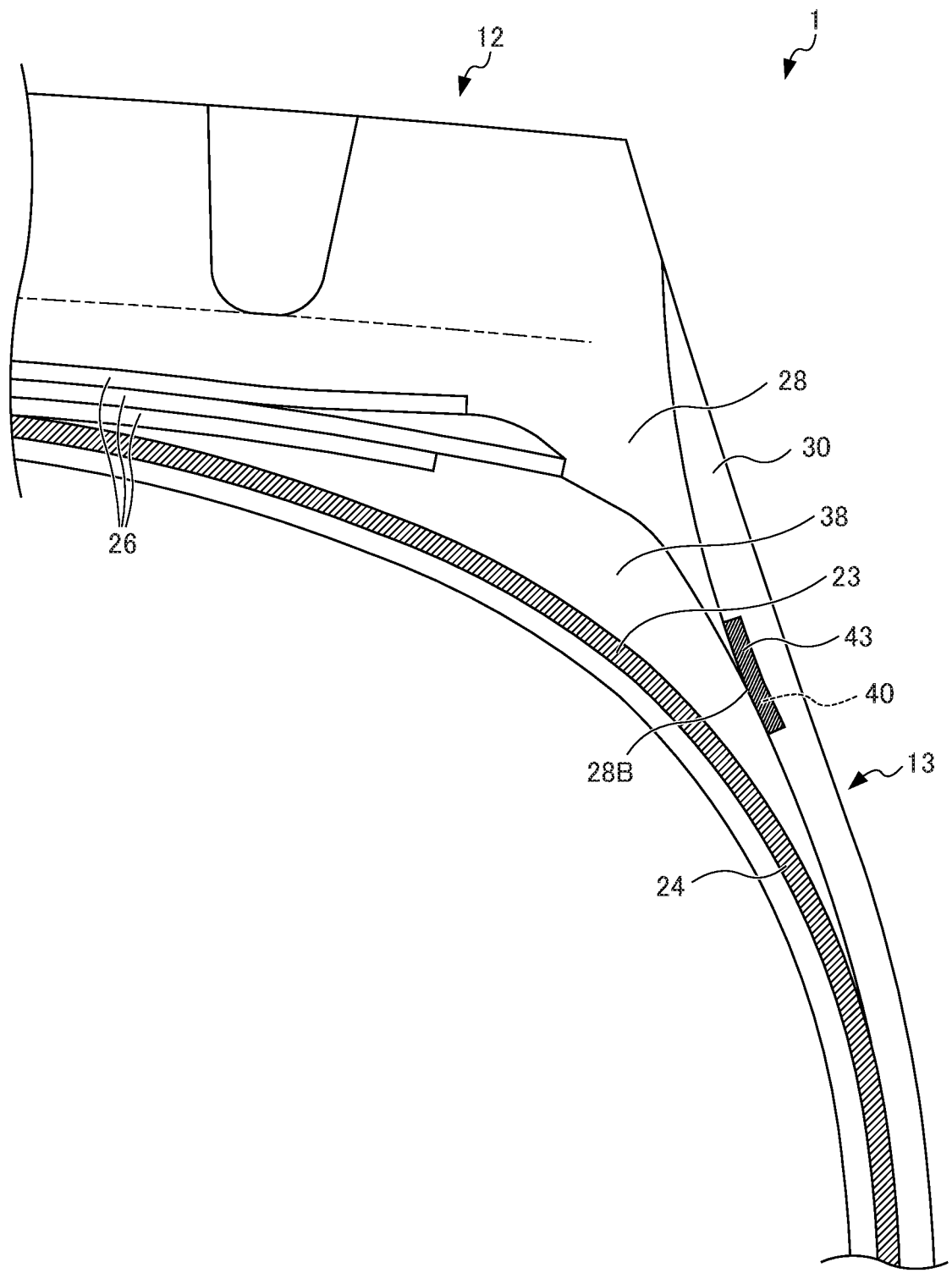
FIG. 2 is a partially enlarged sectional view of a tire according to the first embodiment of the present invention.

FIG. 2 is an enlarged cross-sectional view showing the vicinity of an embedded part of the RFID tag 40 in the tire 1 of FIG. 1. The RFID tag 40 (including a state in which at least part is covered by the protective member 43 described later) is arranged at an intersecting position of at least three rubber members constituting the tire 1. More specifically, the tire 1 of the present embodiment includes the shoulder pad 38 as a first rubber member of the present embodiment, the tread rubber 28 as a second rubber member of the present embodiment, and the side-wall rubber 30 as a third rubber member of the present embodiment covering at least a border region of the shoulder pad 38 and tread rubber 28, in which the RFID tag 40 is arranged at an intersecting position of the shoulder pad 38, tread rubber 28 and side-wall rubber 30.

More specifically, the RFID tag 40 is integrally covered by the protective member 43 consisting of the coating rubber sheet described later, and this protective member 43 is arranged so as to straddle the shoulder pad 38 and tread rubber 28, in a border region of the shoulder pad 38 and tread rubber 28. In other words, this protective member 43 is pasted so as to press down from a tire outer surface side the tire-radial direction inside end 28B of the tread rubber 28 having a tire-radial direction inside end in a cross-sectional view in the tire-width direction that is a tapered shape. Then, with this protective member 43, the tire outer surface side is covered by the side-wall rubber 30.

Herein, each of the shoulder pad 38, tread rubber 28 and side-wall rubber 30 is a rubber member of annular shape constituting the tire 1 of annular shape. Then, the protective member 43 retaining the RFID tag 40 is arranged so as to make surface contact with the shoulder pad 38, tread rubber 28 and side-wall rubber 30.

So long as arranging the RFID tag 40 at such a position, since the RFID tag 40 will be surrounded by a plurality of rubber members, i.e. the shoulder pad 38, tread rubber 28 and side-wall rubber 30, the RFID tag 40 will hardly receive the influence of stress. Then, by defining the border region of a plurality of rubber members, the border region of the shoulder pad 38 and tread rubber 28 in the present embodiment, as a reference for the arrangement position of the RFID tag 40, the variation in the arrangement position of the RFID tag 40 decreases. The possibility of the RFID tag 40 being mistakenly arranged at an unpreferable position from an aspect of stress, distortion or the like also decrease, whereby it is possible to appropriately maintain the function of the RFID tag 40.

In addition, by arranging the RFID tag 40 at a shoulder part, i.e. the tire-radial direction outside vicinity of the side wall, it is possible to arrange the RFID tag 40 at a position sufficiently distanced from the bead core 21 made of metal, which has a possibility of adversely influencing communication. Herein, the bead core 21 is formed in a ring shape by laminating and winding a bead wire made of metal; therefore, it is a metal member having a particularly high possibility of adversely influencing communication. In addition, when considering communication quality, it is preferable for the RFID tag 40 to be arranged in a portion of the tire 1 as close as possible to the outer surface. Assuming that the RFID tag 40 were arranged at the inner cavity side of the carcass ply 23, the communication quality would drop due to being distanced from the outer surface of the tire 1. Furthermore, in the case of the carcass ply 23 being metal, if arranging the RFID tag 40 at the inner cavity side of the carcass ply 23, the communication quality will decline remarkably. When considering these points, the intersecting position of the shoulder pad 38, tread rubber 28 and side-wall rubber 30 is suitable as an embedding position of the RFID tag 40.

In addition, if considering the matter of embedding the RFID tag 40 during the manufacturing process of the tire, it is preferable to arrange the RFID tag 40 at the intersecting position of three rubber members constituting the tire. For example, in the case of interposing the RFID tag 40 between layers of ribbon-like rubber members which are wound, the timing, etc. at which pasting the RFID tag 40 to the ribbon-like rubber member becomes complicated. In addition, in the case of arranging the RFID tag 40 by simply sandwiching between two rubber members, it is difficult to set a reference for the arrangement position thereof, and there is a possibility of the arrangement position of the electronic unit varying. On the other hand, so long as arranging at the intersecting position of the three tire frame members as in the present embodiment, upon precisely pasting the RFID tag 40 in the molding process of the tire at the border region of a first rubber member (shoulder pad 38 in the present embodiment) and a second rubber member (tread rubber 28 in the present embodiment), it is possible to interpose the RFID tag 40 by overlapping a third rubber member (side-wall rubber 30 in the present embodiment) thereon. Even when considering these points, the intersecting position of the shoulder pad 38, tread rubber 28 and side-wall rubber 30 is suitable as the embedding position of the RFID tag 40.

In addition, in a case of arranging the RFID tag 40 to be interposed between plies such as the carcass ply 23, there is a possibility of stress acting on the RFID tag 40 when the interposing plies move in different directions from each other, for example. In addition, in a case of the RFID tag 40 being interposed between a ply such as the carcass ply 23 and a rubber member such as the side-wall rubber, since the physical properties of the ply and rubber greatly differ, there is a possibility of relative motion generating between both members during vulcanization and during use due to the difference in these physical properties, and thus the RFID tag 40 receiving stress. Then, if exceeding the allowed stress, there is a possibility of the RFID tag 40 no longer keeping the function thereof. All of the shoulder pad 38, tread rubber 28 and side-wall rubber 30 are rubber members, and even when considering these points, the intersecting position of the shoulder pad 38, tread rubber 28 and side-wall rubber 30 is suitable as the embedding position of the RFID tag 40.

It should be noted that the shoulder pad 38 is the cushion rubber which has a cushioning property. Consequently, so long as arranging the RFID tag 40 at this portion, it is possible to absorb the strain produced at the periphery of the RFID tag 40. In addition, the shoulder pad is low heat generation. Consequently, the RFID tag 40 provided at such a position is hardly influenced by the heat generation of rubber during use. Even when considering these points, the intersecting position of the shoulder pad 38, tread rubber 28 and side-wall rubber 30 is suitable as the embedding position of the RFID tag 40.

Furthermore, if the RFID tag 40 is arranged at the intersecting position of the shoulder pad 38, tread rubber 28 and side-wall rubber 30, the RFID tag 40 will not be removed in the case of performing retread. In other words, since the portion removed in retread is a more outer side in the tire-radial direction than at least the steel belt 26, among the tread rubber 28, if arranging the RFID tag 40 at the intersecting position of the shoulder pad 38, tread rubber 28 and side-wall rubber 30, the RFID tag 40 can be continuously used without being removed. Also in this point, the intersecting position of the shoulder pad 38, tread rubber 28 and side-wall rubber 30 is suitable as the embedding position of the RFID tag 40.

It should be noted that, when defining the modulus of the shoulder pad 38 as a reference, the side-wall rubber 30 is preferably set as a modulus of 0.4 to 0.7 times that of the shoulder pad 38. In addition, the tread rubber 28 is preferably set as a modulus of 0.4 to 0.9 times that of the shoulder pad 38. By setting such a modulus, it is possible to keep a balance between flexibility and rigidity as a tire. It should be noted that the modulus indicates 100% elongation modulus (M100) under a 23° C. atmosphere, measured in accordance with "3.7 stress at a given elongation, S" of JIS K6251:2010.

Herein, the RFID tag 40 is covered by the coating rubber sheets 431, 432 constituting the protective member 43. This point will be explained while referencing FIGS. 3A to 3C.

Figure 3A:
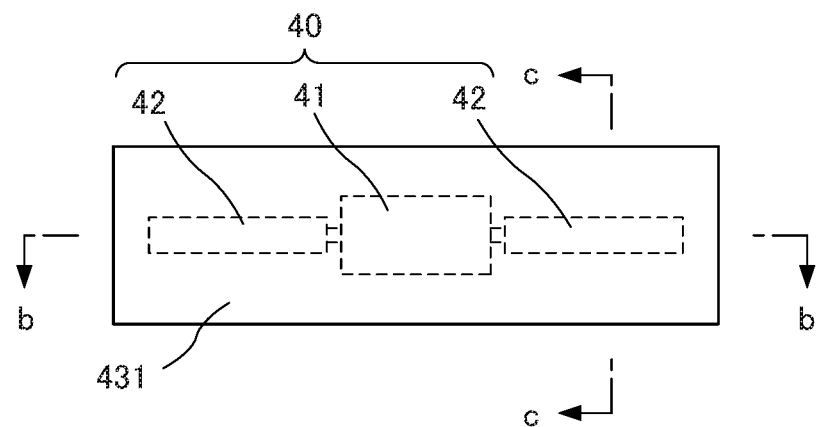
FIG. 3A is a view showing an RFID tag in a tire according to the first embodiment of the present invention, protected by a protective member.
Figure 3B:
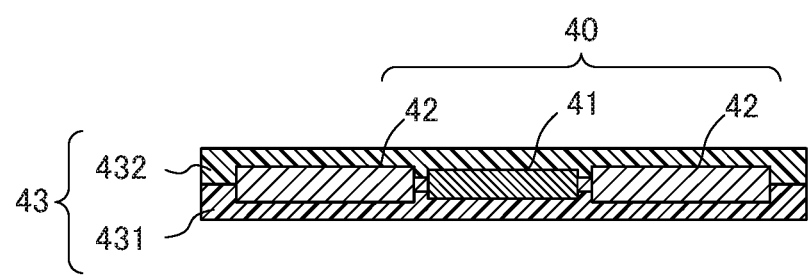
FIG. 3B is a view showing a cross section along the line b-b in FIG. 3A.
Figure 3C:
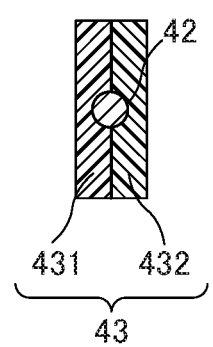
FIG. 3C is a view showing a cross section along the line c-c in FIG. 3A.
Figure 4A:
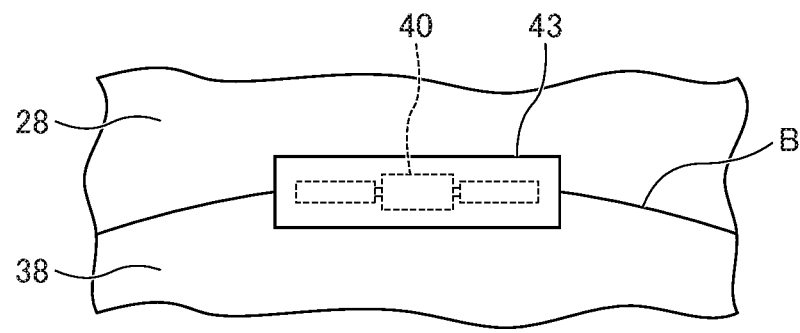
FIG. 4A is a view when looking at a peripheral part of the protective member from an outer side in the tire-width direction, in a manufacturing process of a tire according to the first embodiment of the present invention.

FIG. 3A is a view showing the RFID tag 40 covered by the protective member 43 configured by a rubber sheet. In FIG. 4A, the RFID tag 40 is covered and hidden by the coating rubber sheet 431 described later. FIG. 3B is a cross-sectional view along the line b-b in FIG. 3A, and FIG. 3C is a cross-sectional view along the line c-c in FIG. 3A.

The RFID tag 40 includes an RFID chip 41 and antenna 42 for performing communication with external equipment. As the antenna 42, a coil-shaped spring antenna, plate-shaped antenna, and various types of rod-shaped antennas can be used. For example, it may be an antenna formed by printing a predetermined pattern on a flexible substrate. When considering the communicability and flexibility, a coil-shaped spring antenna is the most preferable. The antenna is established at an antenna length optimized according to the frequency band, etc. to be used.

The protective member 43 is configured from two coating rubber sheets 431, 432 which protect by sandwiching the RFID tag 40.

The protective member 43 is configured by rubber of a predetermined modulus, for example. Herein, the modulus indicates 100% elongation modulus (M100) under a 23° C. atmosphere, measured in accordance with "3.7 stress at a given elongation, S" of JIS K6251:2010.

As the rubber adopted in the protective member 43, rubber at least having a higher modulus than the side wall rubber 30 is used. For example, rubber having a higher modulus than the side wall rubber 30 and lower modulus than the shoulder pad 38 is used.

For example, with the modulus of the side wall rubber 30 as a reference, as the rubber used in the protective member 43, it is preferable to use rubber of a modulus 1.1 to 1.8 times. At this time, as the rubber of the shoulder pad 38, rubber of a modulus 1.6 to 3 times that of the side wall rubber, for example, rubber of a modulus on the order of 2 times thereof, may be used. It should be noted that, if emphasizing reinforcement of the protection of the RFID tag 40, rubber of a modulus higher than the shoulder pad 38 may be adopted as the rubber used in the protective member 43.

It should be noted that, as shown in FIGS. 1 and 2, the RFID tag 40 is arranged in the region of the intersecting position of the shoulder pad 38, tread rubber 28 and side-wall rubber 30. Therefore, by setting the modulus of the protective member 43 to a value higher than the modulus of the side-wall rubber 30 and lower than the modulus of the shoulder pad 38, it is possible to prevent excessive stress from generating within the rubber structure at the embedded part of the RFID tag 40 in the case of the tire deforming. In other words, it is possible to suppress the generation of stress.

In addition, the protective member 43 may be configured from a short-fiber filler mixed rubber. As the short-fiber filler, for example, it is possible to use insulating short fibers like organic short fibers such as aramid short fibers and cellulose short fibers; inorganic short fibers such as ceramic short fibers as in alumina short fiber, and glass short fiber. By mixing such short-fiber fillers into rubber, it is possible to raise the strength of the rubber. In addition, as the protective member 43, a rubber sheet in the vulcanized state may be used. The rubber sheet in a vulcanized state does not plastically deform as raw rubber, and thus can appropriately protect the RFID tag 40. However, if considering the pasting workability during the manufacturing process, or stabilizing of the rubber structures by integrating with other rubber members when vulcanizing, it is more preferable to use a rubber sheet of predetermined thickness in the state prior to vulcanization as the protective member 43.

In addition, as the protective member 43, an organic fiber layer from polyester fibers or polyamide fibers may be provided. It is also possible to embed an organic fiber layer in the two coating rubber sheets 431, 432.

Next, the manufacturing process of the tire 1 will be explained. FIG. 4A is a view when looking from an outer side in the tire-width direction at a peripheral part of the protective member 43 during the manufacturing process, and is a view when pasting the protective member 43 covering the RFID tag 40 to the border region B of the shoulder pad 38 and tread rubber 28.

The RFID tag 40 covered by the protective member 43 is mounted before the vulcanization process in the manufacturing process of the tire. As shown in FIG. 4A, in the manufacturing process of the tire 1 in the present embodiment, the protective member 43 covering the RFID tag 40 is pasted so as to straddle the shoulder pad 38 and tread rubber 28 in the border region B of the shoulder pad 38 and tread rubber 28. In other words, this protective member 43 is pasted so as to press down the tire-radial direction inside end 28B of the tread rubber 28 having a tire-radial direction inside end in a cross-sectional view in the tire-width direction (FIGS. 1 and 2) that is a tapered shape. By pasting the protective member 43 at such a position, it is possible to partially assist the joining between rubber members, i.e. joining of the shoulder pad 38 and tread rubber 28.

In addition, by defining the border region between a plurality of rubber members, the border region B of the shoulder pad 38 and tread rubber 28 in the present embodiment, as a reference for the arrangement position of the RFID tag 40, the variation in the arrangement position of the RFID tag 40 decreases. The possibility of the RFID tag 40 being mistakenly arranged at an unpreferable position from an aspect of stress, distortion or the like also decreases, whereby it is possible to appropriately maintain the function of the RFID tag 40.

Subsequently, in FIG. 4A, the side-wall rubber 30 which is not shown (refer to FIGS. 1 and 2) is pasted so as to cover the protective member 43 pasted to the border region B of the shoulder pad 38 and tread rubber 28. The RFID tag 40 covered by the protective member 43 is thereby arranged at the intersecting position of at least three rubber members constituting the tire 1, the intersecting position of the shoulder pad 38, tread rubber 28 and side-wall rubber 30 in the present embodiment.

At this time, the coating rubber of the shoulder pad 38, tread rubber 28 and side-wall rubber 30 are in the state of raw rubber prior to vulcanization; therefore, the RFID tag 40 covered by the protective member 43 may be pasted to these members using the adhesiveness thereof. Alternatively, in a case of the adhesive property being low or the like, it may be pasted using an adhesive or the like.

The respective rubber members, etc. constituting the tire are assembled in this way, whereby the green tire is formed. Subsequently, the green tire in which the respective constituent members including the RFID tag 40 are assembled is vulcanized in the vulcanization process to manufacture the tire.

In this way, in the present embodiment, during tire manufacture, since it is possible to paste the RFID tag 40 covered by the protective member 43 to the shoulder 38 and tread rubber 28 which are in the raw rubber state, the assembly work of the RFID tag 40 in the manufacturing process of the tire is easy. In particular, since the shoulder pad 38 has a certain level of rigidity even in the raw rubber state, the mounting work of the RFID tag 40 covered by the protective member 43 is easy.

It should be noted that the following such manufacturing process may be adopted as a modified example of the manufacturing process of the tire 1. In other words, the protective member 43 covered by the RFID tag 40 is pasted to a side of the side-wall rubber 30, and subsequently, the side-wall rubber 30 to which the protective member 43 is pasted is then pasted to the shoulder pad 38 and tread rubber 28. Herein, when pasting the side-wall rubber 30 to the shoulder pad 28 and tread rubber 28, the protective member 43 is pasted to the side-wall rubber 30 so that the protective member 43 is arranged at the border region B of the shoulder pad 38 and tread rubber 28. Even in a case of adopting such a process, the RFID tag 40 covered by the protective member 43 is arranged at the intersecting position of at least three rubber members constituting the tire 1, i.e. the intersecting position of the shoulder pad 38, tread rubber 28 and side-wall rubber 30. Consequently, since the RFID tag 40 is surrounded by a plurality of rubber members, the RFID tag 40 will hardly receive the influence of stress. Then, the border region of the plurality of rubber members becomes a reference for the arrangement position of the RFID tag 40.

In addition, if configuring the protective member 43 by the two coating rubber sheets 431, 432, since it is possible to thinly form the RFID tag 40 including the protective member 43, it is suitable upon embedding the tire 1. In addition, when assembling the RFID tag 40 to the constituent members of the tire 1 prior to vulcanization, the RFID tag 40 covered by the coating rubber sheets can be installed very easily. For example, at a desired position of a member such as the border region of a plurality of rubber members prior to vulcanization, it is possible to appropriately paste the RFID tag 40 covered by the coating rubber sheets 431, 432 using the adhesiveness of the raw rubber. In addition, by also establishing the coating rubber sheets 431, 432 as raw rubber prior to vulcanization, it is possible to more easily paste by employing the adhesiveness of the coating rubber sheet itself as well.

However, the protective member 43 is not limited to the form configured by two coating rubber sheets, and can adopt various forms. For example, so long as the coating rubber sheets constituting the protective member is covering at least part of the RFID tag 40, effects can be obtained such as an improvement in workability in the manufacturing process and stress mitigation. Consequently, a configuration may be adopted which covers only one side of the RFID tag 40 by the one coating rubber sheet 431 serving as the protective member. In addition, for example, it may be a configuration wrapping one rubber sheet around the entire circumference of the RFID tag 40, or a configuration attaching the protective member in the form of a potting agent of high viscosity along the entire circumference of the RFID tag 40. Even if a configuration by such coating rubber, it will be possible to appropriately protect the RFID tag 40.

It should be noted that the RFID tag 40 covered by the protective member 43 is embedded in the tire 1 so that the direction in which the antenna extends, i.e. the longitudinal direction thereof, becomes the direction of the tangential line relative to the circumferential direction of the tire 1, for example, i.e. direction orthogonal to the paper plane in the cross-sectional view of FIGS. 1 and 2. In addition, the coating rubber sheets 431, 432 are embedded in the tire 1 in a form such that aligns in the tire-width direction. In other words, in the manufacturing process, one surface of either one of the coating rubber sheets 431, 432 is pasted to a constituent member of the tire 1 prior to vulcanization, e.g., the shoulder pad 38 and tread rubber 28. Then, the RFID tag 40 covered by the protective member 43 is arranged between the shoulder pad 38, tread rubber 28 and side-wall rubber 30. By establishing such a form, stress will hardly act on the RFID tag 40, even when the tire 1 deforms. In addition, in the manufacturing process, the work of attaching the RFID tag 40 covered by the protective member 43 becomes easy.

Herein, in the mounting process of the RFID tag 40, it is possible to simply arrange the RFID tag 40 covered by the protective member 43 in the aforementioned direction, by defining the border region of the plurality of rubber members, the circular shape of the border region B of the shoulder pad 38 and tread rubber 28 shown in FIG. 5A (inner edge shape of the tire-radial direction inside end 28B of the tread rubber 28), as a reference. In other words, as shown in FIG. 4A, the RFID tag 40 may be pasted so as to substantially match the longitudinal direction of the coating rubber sheets 431, 432 with the tangential line direction of the circular shape of the border region B, with the circular shape of the border region B as a reference.

Figure 4B:
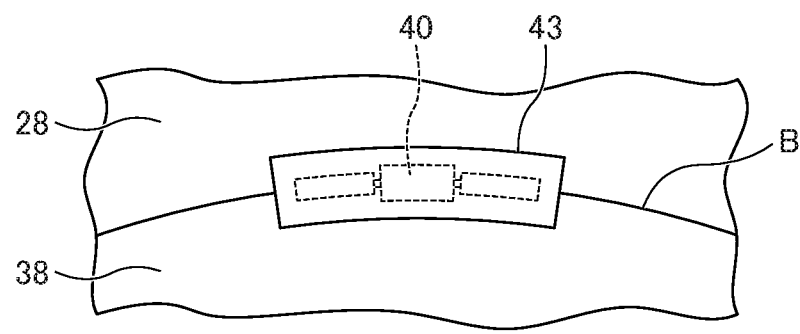
FIG. 4B is a view when looking at a peripheral part of the protective member from an outer side in the tire-width direction, in a modified example of a manufacturing process of the tire according to the first embodiment of the present invention.

FIG. 4B is a view showing a modified example of the manufacturing process, and shows a case of pasting while bending the coating rubber sheets 431, 432 covering the RFID tag 40 so as to follow the circular shape of the border region B of the shoulder pad 38 and tread rubber 28. At this time, the coating rubber sheets 431, 432 formed from raw rubber can also be pasted while deforming so as to follow the circumferential direction of the border region B. Using a flexible coil-shaped spring antenna or the like as the antenna of the RFID tag 40, a form such that the antenna also deforms following the deformation of the coating rubber sheets 431, 432 may be established. By way of these methods, it is possible to arrange the RFID tag 40 covered by the protective member 43 simply and accurately in the aforementioned direction, without giving special markers.

Figure 4C:
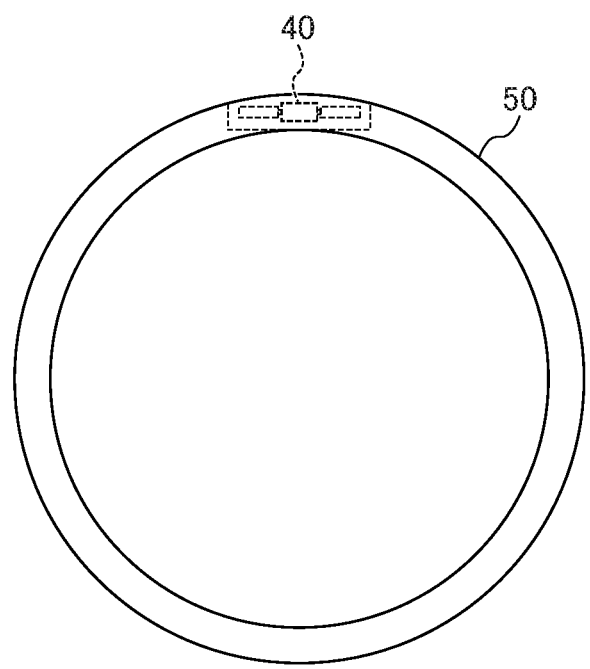
FIG. 4C is a view showing a rubber sheet of annular shape as a modified example of the protective member, in the tire according to the first embodiment of the present invention.

FIG. 4C is a view showing the annular rubber sheet 50 as a modified example of the protective member. For example, the RFID tag 40 is interposed by the two annular coating rubber sheets to configure the protective member. In this case, it is preferable to establish a form covering the entire circumference of the border region B of the shoulder pad 38 and tread rubber 28 by the annular rubber sheet 50. It is thereby possible to supplement on the whole the joining between rubber members, i.e. joining between the shoulder pad 38 and tread rubber 28.

Figure 5:
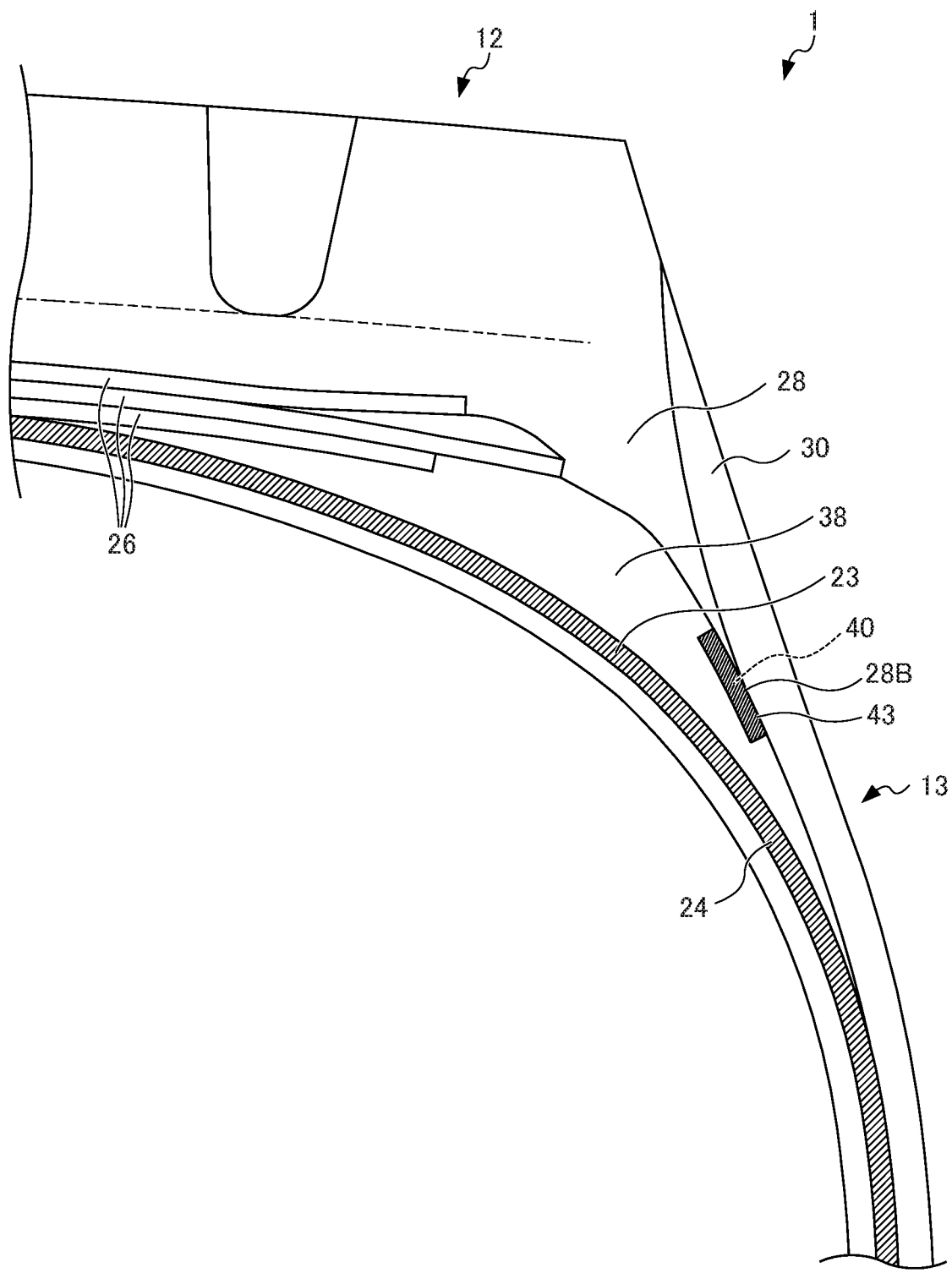
FIG. 5 is a partially enlarged cross-sectional view of a tire according to a first modified example of the first embodiment of the present invention.
Figure 6:
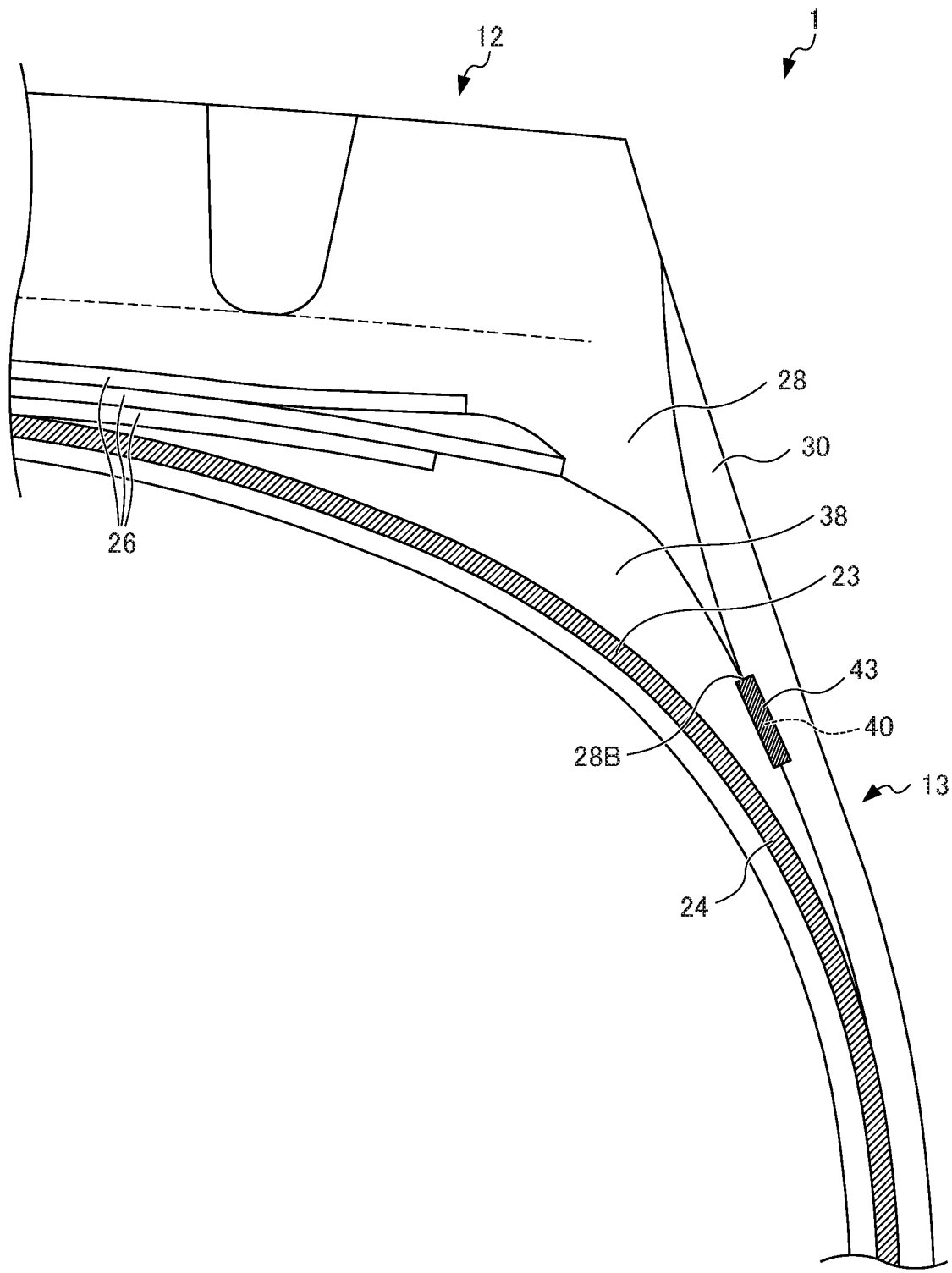
FIG. 6 is a partially enlarge cross-sectional view of a tire according to a second modified example of the first embodiment of the present invention.

FIGS. 5 and 6 show a modified example of the tire 1 of the present embodiment. In a first modified example shown in FIG. 5, the protective member 43 covering the RFID tag 40 is arranged at the intersecting position of the shoulder pad 38, tread rubber 28 and side-wall rubber 30. Then, in the present modified example, the protective member 43 covering the RFID tag 40 is arranged so as to straddle the side-wall rubber 30 and tread rubber 28 in the border region of the side-wall rubber 30 and tread rubber 28. In other words, the protective member 43 is pasted so as to press from the tire inner cavity side the tire-radial direction inside end 28B of the tread rubber 28 having a tire-radial direction inside end in the cross-sectional view in the tire-width direction that is a tapered shape. Then, regarding the protective member 43, the tire inner cavity side is covered by the shoulder pad 38. Even when arranging the RFID tag 40 at such a position, since the RFID tag 40 will be surrounded by a plurality of rubber members, i.e. the shoulder pad 38, tread rubber 28 and side-wall rubber 30, the RFID tag 40 will hardly receive the influence of stress. Then, by defining the border region of a plurality of rubber members, the border region of the side-wall rubber 30 and tread rubber 28 in the present modified example, as a reference for the arrangement position of the RFID tag 40, the variation in the arrangement position of the RFID tag 40 decreases. The possibility of the RFID tag 40 being mistakenly arranged at an unpreferable position from an aspect of stress, distortion or the like also decreases, whereby it is possible to appropriately maintain the function of the RFID tag 40. In addition, so long as being between three rubber members, it is possible to comfortably secure the arrangement position of the RFID tag 40 even after vulcanization, and uniformity becomes favorable.

In a second modified example shown in FIG. 6, the protective member 43 covering the RFID tag 40 is arranged at the intersecting position of the shoulder pad 38, tread rubber 28 and side-wall rubber 30. Then, in the present modified example, the protective member 43 covering the RFID tag 40 is arranged so as to contact with the tire-radial direction inside end 28B of the tread rubber 28 having a tire-radial direction inside end in a cross-sectional view in the tire-width direction that is a tapered shape. Even when arranging the RFID tag 40 at such a position, since the RFID tag 40 will be surrounded by a plurality of rubber members, i.e. the shoulder pad 38, tread rubber 28 and side-wall rubber 30, the RFID tag 40 will hardly receive the influence of stress. Then, by defining the border region of a plurality of rubber members, the border region of the shoulder pad 38 and tread rubber 28 in the present modified example, as a reference for the arrangement position of the RFID tag 40, the variation in the arrangement position of the RFID tag 40 decreases. The possibility of the RFID tag 40 being mistakenly arranged at an unpreferable position from an aspect of stress, distortion or the like also decreases, whereby it is possible to appropriately maintain the function of the RFID tag 40.

It should be noted that although it is preferable for the RFID tag 40 to be arranged at the intersecting position of the shoulder pad 38, tread rubber 28 and side-wall rubber 30 in a state covered by the above such protective member 43, it may be arranged at the intersecting position of the shoulder pad 38, tread rubber 28 and side-wall rubber 30 directly without covering by the protective member 43. If arranging the uncovered RFID tag 40 at the intersecting position of the shoulder pad 38, tread rubber 28 and side-wall rubber 30 directly, the fluctuation in thickness of the rubber member at the portion where the RFID tag 40 is arranged decreases, and the uniformity of the tire improves. In addition, in the work for embedding the RFID tag 40 at such a position, the removal of air also becomes easier by the volume of the embedded object being smaller. In addition, by a process of covering the RFID tag 40 by the protective member being eliminated, the work time shortens.

It should be noted that, in the present embodiment, the RFID tag 40 is embedded in the tire as the electronic unit; however, the electronic unit embedded in the tire is not limited to an RFID tag. For example, it may be various electronic units such as a sensor which carries out wireless communication. In addition, since the electronic unit handles electrical information such as the transmission of electrical signals, there is a possibility of the performance declining due to metal components being present in the vicinity. In addition, there is a possibility of the electronic unit being damaged by excessive stress acting thereon. Therefore, it is possible to obtain the effects of the present invention also in the case of embedding various electronic units in a tire. For example, the electronic unit may be a piezoelectric element or strain sensor.

According to the tire 1 of the present embodiment, the following effects are exerted.

(1) The tire 1 of the present embodiment includes a plurality of rubber members constituting the tire 1, and the RFID tag 40, and the RFID tag 40 is arranged at the intersecting position of at least three rubber members. The RFID tag 40 thereby will hardly receive the influence of stress. Then, by defining the border region of the plurality of rubber members, the border region B of the shoulder pad 38 and tread rubber 38 in the present embodiment, as a reference for the arrangement position of the RFID tag 40, the variation in the arrangement position of the RFID tag 40 decreases. The possibility of the RFID tag 40 being mistakenly arranged at an unpreferable position from an aspect of stress, distortion or the like also decreases, whereby it is possible to appropriately maintain the function of the RFID tag 40.

(2) In the tire 1 according to the present embodiment, each of the three rubber members is an annular rubber member formed in a ring shape. In this way, even if the three rubber members are annular rubber members, which are tire frame members constituting the tire 1 of annular shape, it is possible to obtain the aforementioned effects.

(3) The tire 1 according to the present embodiment includes the shoulder pad 38 as a rubber member which is arranged at the outer surface side of the carcass ply 23 and arranged on the inner cavity side of the tread rubber 28 and side-wall rubber 30, and the RFID tag 40 is arranged at the intersecting position of the shoulder pad 38, tread rubber 28 and side-wall rubber 30. Even if such a configuration, it is possible to obtain the aforementioned effects. In addition, so long as arranging the RFID tag 40 at such a position, favorable communication performance, etc. will be obtained.

(4) In the tire 1 according to the present embodiment, at least part of the RFID tag 40 is covered by the coating rubber sheets 431, 432, and the coating rubber sheets 431, 432 covering the RFID tag 40 are arranged at the intersecting position of at least three rubber members. It is thereby possible to also supplement joining between the rubber members, the joining of the shoulder pad 38 and tread rubber 28 in the present embodiment.

(5) The three rubber members according to the present embodiment include a first rubber member, a second rubber member having an end part in a cross-sectional view in the tire-width direction that is a tapered shape, arranged so as to cover the first rubber member, and a third rubber member which covers at least a border region of the first rubber member and second rubber member, in which the coating rubber sheets 431, 432 are arranged so as to straddle the first rubber member and second rubber member in the border region of the first rubber member and second rubber member, and are covered by the third rubber member. It is thereby possible to supplement joining between the rubber members, the joining of the shoulder pad 38 as the first rubber member and the tread rubber 28 as the second rubber member in the present embodiment.

(6) The manufacturing method for manufacturing the tire 1 according to the present embodiment includes a step of pasting the coating rubber sheets 431, 432 so as to straddle the first rubber member and second rubber member in the border region of the first rubber member and second rubber member; and a step of pasting the third rubber member so as to cover the coating rubber sheets 431, 432 pasted to the border region of the first rubber member and second rubber member. It is thereby possible to supplement joining between rubber members, the shoulder pad 38 as the first rubber member and the tread rubber 28 as the second rubber member in the present embodiment.

(7) In the tire 1 according to the present embodiment, the RFID tag 40 as the electronic unit is covered by the rubber sheet 50 of annular shape, and the rubber sheet 50 of annular shape covers over the entire circumference of the border region of the first rubber member of annular shape and the second rubber member of annular shape. It is thereby possible to supplement on the whole joining between the first rubber member and the second rubber member. For example, it is possible to supplement on the whole joining of the shoulder pad 38 as the first rubber member and the tread rubber 28 as the second rubber member.

Second Embodiment

Next, a tire according to a second embodiment will be explained while referencing the drawings. It should be noted that, in the following explanation, the same reference number will be assigned for configurations which are the same as the first embodiment, and detailed explanations thereof will be omitted.

Figure 7:
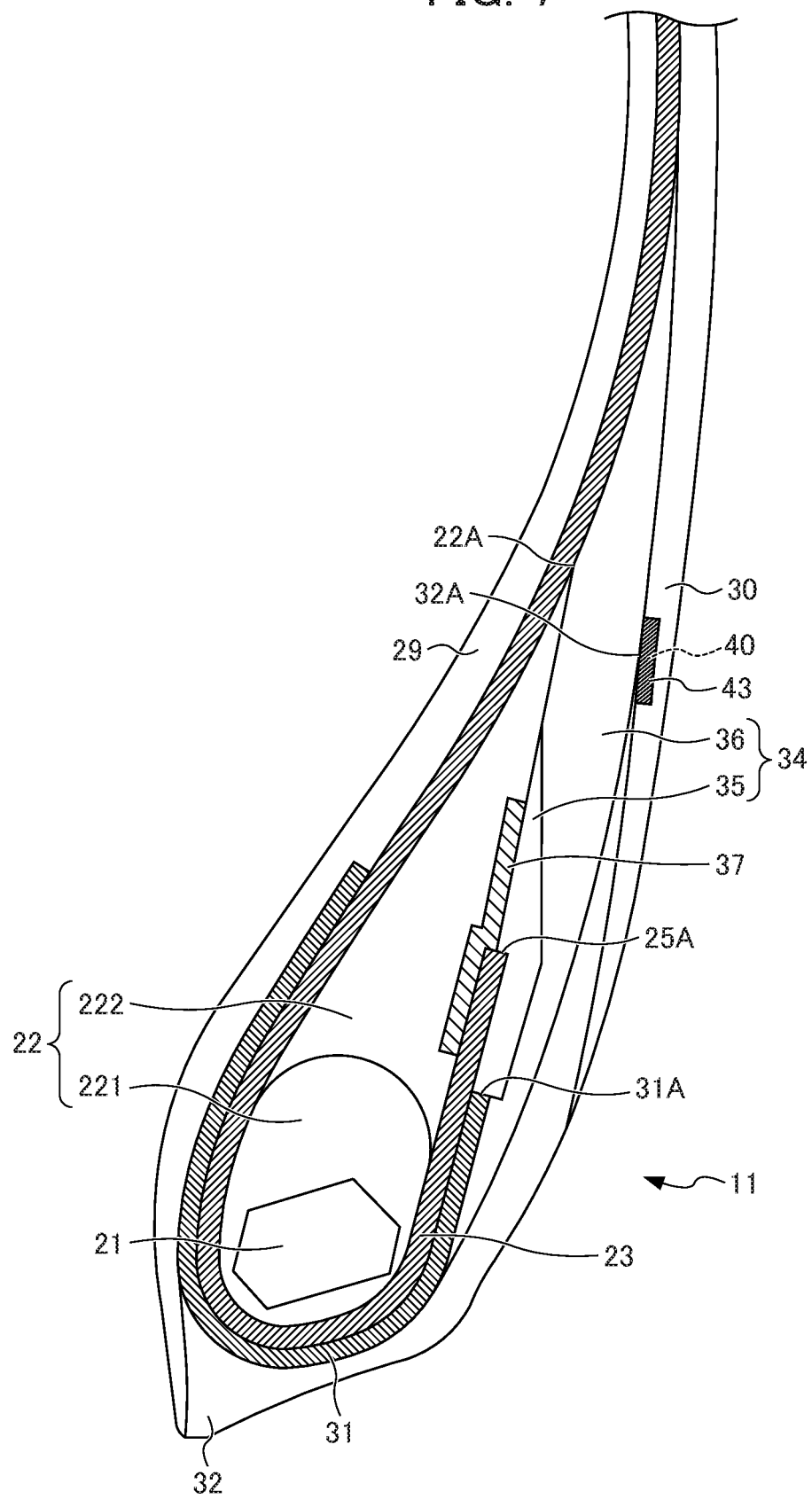
FIG. 7 is a partially enlarged cross-sectional view of a tire according to a second embodiment of the present invention.

FIG. 7 is an enlarged cross-sectional view showing the vicinity of the embedded part of the RFID tag 40 in the tire 1 of the present embodiment. As shown in FIG. 7, the RFID tag 40 (including a state in which at least part is covered by the protective member 43) is arranged at the intersecting position of at least three rubber members constituting the tire 1. More specifically, the tire 1 according to the present embodiment includes the second pad 36 as the first rubber member of the present embodiment, the rim strip rubber 32 as the second rubber member in the present embodiment arranged so as to cover part on the tire outer surface side of the second pad 36, and the side-wall rubber 30 as the third rubber member in the present embodiment covering at least the border region of the second pad 36 and rim strip rubber 32, in which the RFID tag 40 is arranged at the intersecting position of the second pad 36, rim strip rubber 32 and side-wall rubber 30.

Then, also in the present embodiment, the RFID tag is preferably retained by being covered by the protective member 43 consisting of coating rubber sheets, and this protective member 43 is arranged so as to straddle the second pad 36 and rim strip rubber 32 in the border region of the second pad 36 and rim strip rubber 32. In other words, this protective member 43 is pasted so as to press down the tire-radial direction outside end 32A of the rim strip rubber 32 having a tire-radial direction outside end in a cross-sectional view in the tire-width direction that is a tapered shape. Then, with this protective member 43, the tire outer surface side is covered by the side-wall rubber 30.

Herein, each of the second pad 36, rim strip rubber 32 and side-wall rubber 36 is a rubber member of annular shape constituting the tire 1 of annular shape. Then, the protective member 43 retaining the RFID tag 40 is arranged so as to make surface contact with the second pad 36, rim strip rubber 32 and side-wall rubber 30.

Even when arranging the RFID tag 40 at such a position, since the RFID tag 40 will be surrounded by a plurality of rubber members, i.e. the second pad 36, rim strip rubber 32 and side-wall rubber 30, the RFID tag 40 will hardly receive the influence of stress. Then, by defining the border region of a plurality of rubber members, the border region of the second pad 36 and rim strip rubber 32 in the present embodiment, as a reference for the arrangement position of the RFID tag 40, the variation in the arrangement position of the RFID tag 40 decreases. The possibility of the RFID tag 40 being mistakenly arranged at an unpreferable position from an aspect of stress, distortion or the like also decreases, whereby it is possible to appropriately maintain the function of the RFID tag 40.

It should be noted that, when setting the modulus of the second pad 36 as a reference, the side-wall rubber 30 is preferably set as a modulus of 0.4 to 0.6 times that of the second pad 36. In addition, the first pad 35 is preferably set as a modulus of 1.1 times to 1.2 times that of the second pad 36. In addition, the second bead filler 222 is preferably set as a modulus of 0.7 to 0.8 times that of the second pad. Then, when defining the modulus of the second pad as the reference, the rim strip rubber 32 is preferably set as a modulus of 0.8 to 1 times that of the second pad 36. Then, the rubber sheet 37 is preferably set as a modulus of 1.1 times to 1.2 times that of the second pad 36. In other words, the modulus of the rubber sheet 37 is preferably set as a modulus substantially equal to the modulus of a portion (first pad 35) of the pad member 34 covering the folding end 25A of the carcass ply 23. By setting such a modulus, it is possible to keep a balance between the flexibility of the tire and the rigidity in the vicinity of the bead 11. It should be noted that the modulus indicates 100% elongation modulus (M100) under a 23° C. atmosphere, measured in accordance with "3.7 stress at a given elongation, S" of JIS K6251:2010.

Figure 8:
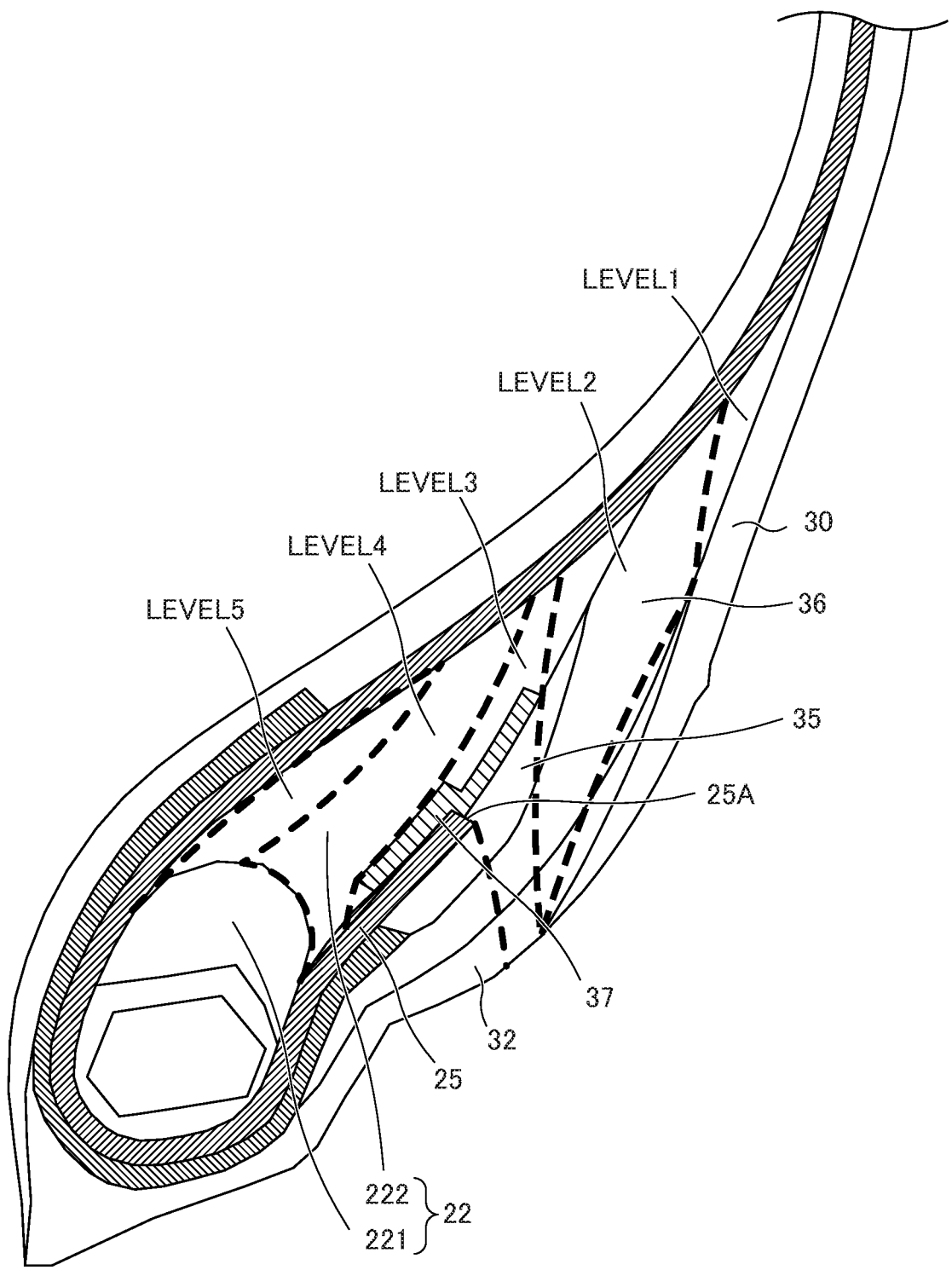
FIG. 8 is a view showing the results of an in-plane distribution simulation of strain energy in a case of mounting the tire to a rim, and applying 100% load.

FIG. 8 is a view showing the results of an in-plane distribution simulation of strain energy in a case of mounting the tire 1 of the present embodiment to a rim, and applying 100% load. In the enlarged cross-sectional view shown in FIG. 8 displays by dividing the region into five, according to the magnitude of the strain energy. Herein, a region having the highest strain energy is defined as level 5, a region having high strain energy is defined as level 4, a region in which the strain energy somewhat declined is defined as level 3, a region in which the strain energy further declined is defined as level 2, and the region in which the strain energy declined the most is defined as level 1. FIG. 8 displays by dividing the regions with bold dotted lines as the boundary.

The intersecting position of the second pad 36, rim strip rubber 32 and side-wall rubber 30 becomes a region of mostly level 1~2, having little strain energy, and upon arranging the RFID tag 40, becomes a very preferable region.

It should be noted that, in the manufacturing process of the tire 1, the step of pasting the protective member 43 as the coating rubber sheet so as to straddle the first rubber member and second rubber member in the border region of the first rubber member and second rubber member, the point of pasting the third rubber member so as to cover the coating rubber sheet pasted to the border region of the first rubber member and second rubber member, and the like are the same as the first embodiment.

According to the tire 1 of the present embodiment, the following effects are exerted in addition to the above (1), (2), and (4) to (7).

(8) In the tire 1 according to the present embodiment, the RFID tag 40 is arranged at the intersecting position of the second pad 36, rim strip rubber 32 and side-wall rubber 30. The RFID tag 40 can thereby keep the function thereof, without being affected by excessive distortion.

Third Embodiment

Next, a tire according to a third embodiment will be explained while referencing the drawings. It should be noted that, in the following explanation, the same reference number will be assigned for configurations which are the same as the first and second embodiments, and detailed explanations thereof will be omitted.

Figure 9:
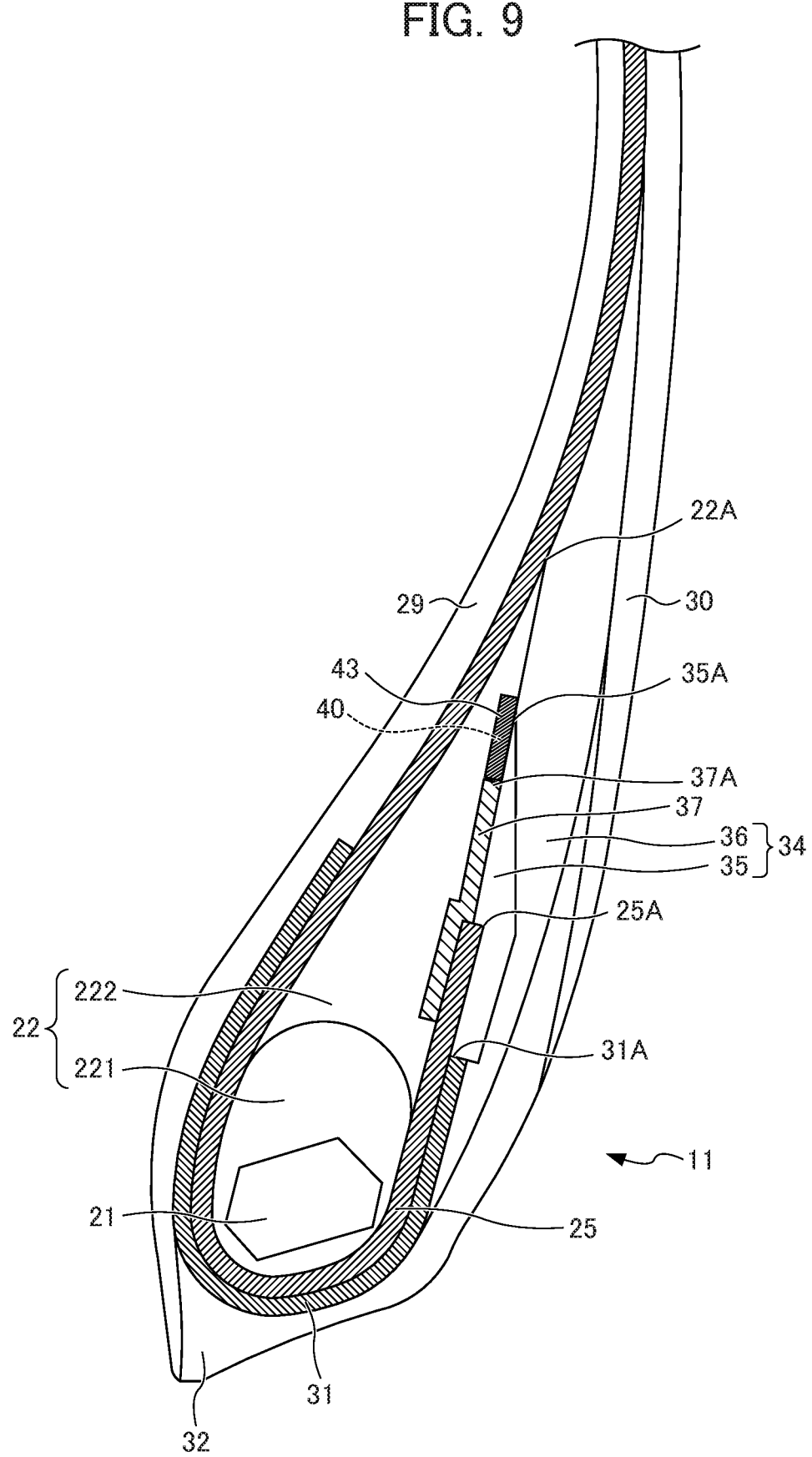
FIG. 9 is a partially enlarged cross-sectional view of a tire according to a third embodiment of the present invention.
Figure 10:
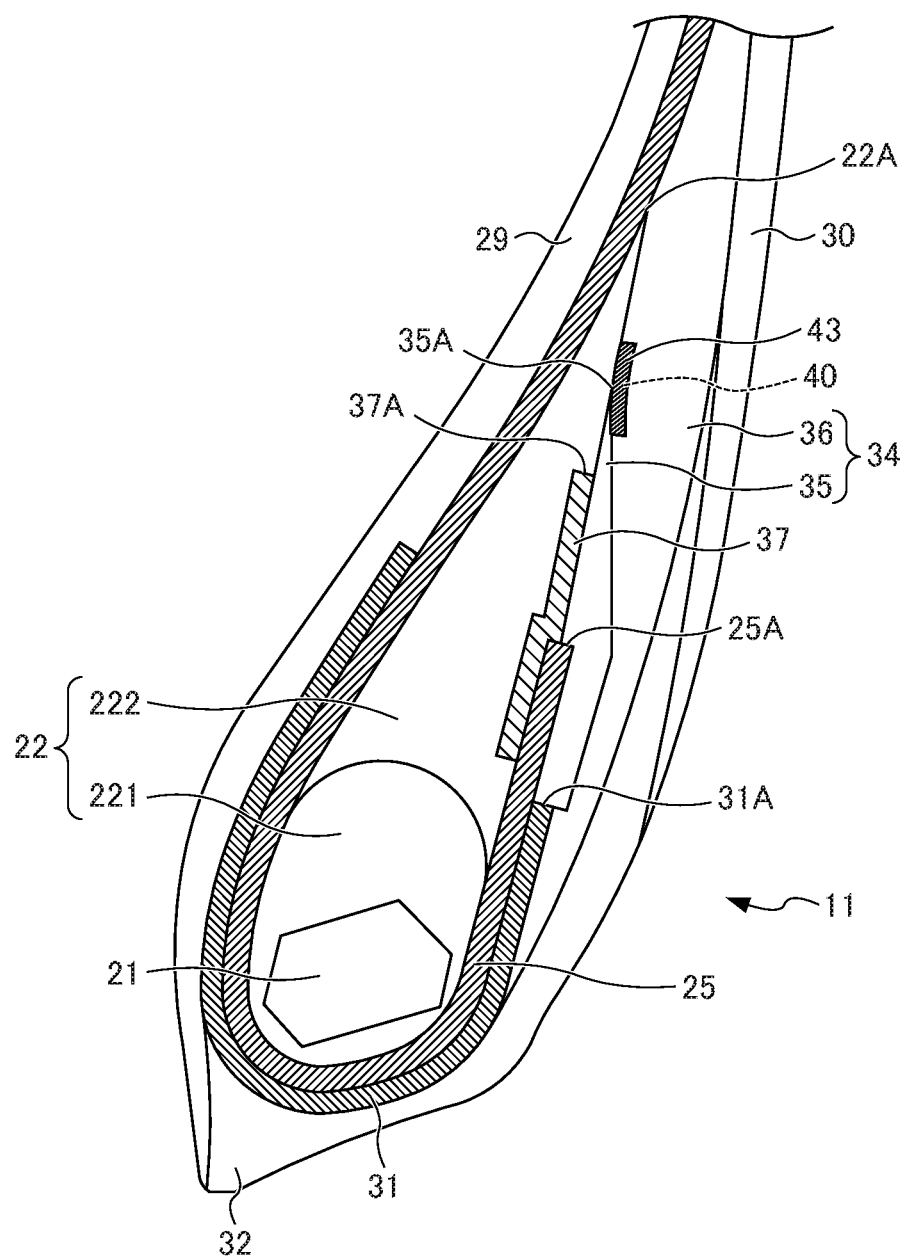
FIG. 10 is a partially enlarged cross-sectional view of a tire according to a first modified example of the third embodiment of the present invention.

FIG. 9 is an enlarged cross-sectional view showing the vicinity of the embedded part of the RFID tag 40 in the tire 1 of the present embodiment. As shown in FIG. 9, the RFID tag 40 (including a state in which at least part is covered by the protective member 43) is arranged at the intersecting position of at least three rubber members constituting the tire 1. More specifically, the tire 1 of the present embodiment includes the second pad 36 as the first rubber member, the first pad 35 as the second rubber member and the second bead filler 222 as the third rubber member, in which the RFID tag 40 is arranged at the intersecting position of the second pad 36, first pad 35 and second bead filler 222.

Then, also in the present embodiment, the RFID tag 40 is more preferably retained by being covered by the protective member 43 consisting of coating rubber sheets, and this protective member is arranged so as to straddle the second pad 36 and first pad 35 in the border region of the second pad 36 and first pad 35. In other words, the protective member 43 is pasted so as to press down the tire-radial direction outside end 35A of the first pad 35 having a tire-radial direction outside end in a cross-sectional view in the tire-width direction that is a tapered shape. Then, in the protective member 43, the tire inner cavity side is covered by the second bead filler 222.

Herein, each of the second pad 36, first pad 35 and second bead filler 222 is a rubber member of annular shape constituting the tire 1 of annular shape. Then, the protective member 43 retaining the RFID tag 40 is arranged so as to make surface contact with the second pad 36, first pad 35 and second bead filler 222.

Even if arranging the RFID tag 40 at such a position, since the RFID tag 40 will be surrounded by a plurality of rubber members, i.e. the second pad 36, first pad 35 and second bead filler 222, the RFID tag 40 will hardly receive the influence of stress. Then, by defining the border region of the plurality of rubber members, the border region of the second pad 36 and first pad 35 in the present modified example, as a reference for the arrangement position of the RFID tag 40, the variation in the arrangement position of the RFID tag 40 decreases. The possibility of the RFID tag 40 being mistakenly arranged at an unpreferable position from an aspect of stress, distortion or the like also decreases, whereby it is possible to appropriately maintain the function of the RFID tag 40.

It should be noted that, in the manufacturing process of the tire 1, the step of pasting the protective member 43 as the coating rubber sheet so as to straddle the first rubber member and second rubber member in the border region of the first rubber member and second rubber member, the point of pasting the third rubber member so as to cover the coating rubber sheet pasted to the border region of the first rubber member and second rubber member, and the like are the same as the first embodiment.

FIGS. 10 to 13 show modified examples of the tire 1 of the present embodiment. These modified examples are examples in cases of differing the three rubber members surrounding the RFID tag 40. However, the point of using the second pad 36 as one rubber member thereamong is shared. Also in the first modified example shown in FIG. 10, the protective member 43 covering the RFID tag 40 is arranged at the intersecting position of at least three rubber members constituting the tire 1. More specifically, the tire 1 of the embodiment of the present modified example is arranged at the intersecting position of the second pad 36, first pad 34 and second bead filler 222. Then, in the present modified example, the protective member 43 covering the RFID tag 40 is arranged so as to straddle the second bead filler 222 and first pad 35, in the border region of the second bead filler 222 and first pad 35. In other words, the protective member 43 is pasted so as to press down the tire-radial direction outside end 35A of the first pad 35 having a tire-radial direction outside end in a cross-sectional view in the tire-width direction that is a tapered shape. Then, in the protective member 43, the tire outer surface side is covered by the second pad 36. Even if arranging the RFID tag 40 at such a position, since the RFID tag 40 will be surrounded by a plurality of rubber members, i.e. the second pad 36, first pad 35 and second bead filler 222, the RFID tag 40 will hardly receive the influence of stress. Then, by defining the border region of the plurality of rubber members, the border region of the bead filler 222 and first pad 35 in the present modified example, as a reference for the arrangement position of the RFID tag 40, the variation in the arrangement position of the RFID tag 40 decreases. The possibility of the RFID tag 40 being mistakenly arranged at an unpreferable position from an aspect of stress, distortion or the like also decreases, whereby it is possible to appropriately maintain the function of the RFID tag 40.

Figure 11:
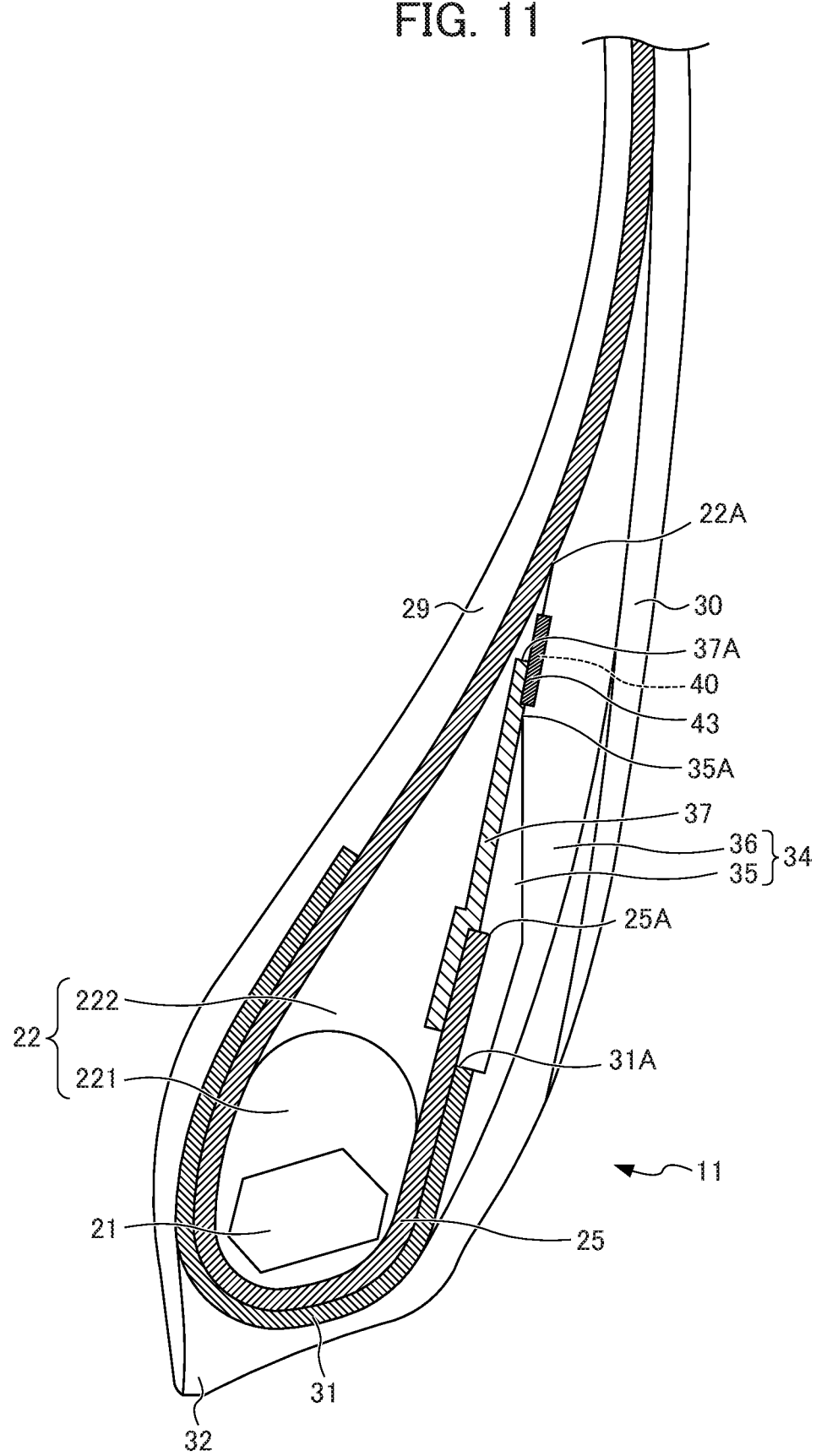
FIG. 11 is a partially enlarged cross-sectional view of a tire according to a second modified example of a third embodiment of the present invention.

Also in the modified example shown in FIG. 11, the protective member 43 covering the RFID tag 40 is arranged at the intersecting position of at least three rubber members constituting the tire 1. More specifically, the tire 1 of the embodiment of the present modified example arranges at the intersecting position of the second bead filler 222, rubber sheet and second pad 36. Then, in the present modified example, the protective member 43 covering the RFID tag 40 is arranged so as to straddle the second bead filler 222 and rubber sheet 37, in the border region of the second bead filler 222 and rubber sheet 37. In other words, the protective member 43 is pasted so as to press down the tire-radial direction outside end 37A of the rubber sheet 37. Then, with the protective member 43, the tire outer surface side is covered by the second pad 36. It should be noted that the rubber sheet 37 is formed slightly larger at the outer side direction of the tire-radial direction than the first modified example shown in FIG. 10. Even if arranging the RFID tag 40 at such a position, since the RFID tag 40 will be surrounded by a plurality of rubber members, i.e. second bead filler 222, rubber sheet 37 and second pad 36, the RFID tag 40 will hardly receive the influence of stress. Then, by defining the border region of the plurality of rubber members, the border region of the bead filler 222 and rubber sheet 37 in the present modified example, as a reference for the arrangement position of the RFID tag 40, the variation in the arrangement position of the RFID tag 40 decreases. The possibility of the RFID tag 40 being mistakenly arranged at an unpreferable position from an aspect of stress, distortion or the like also decreases, whereby it is possible to appropriately maintain the function of the RFID tag 40.

Figure 12:
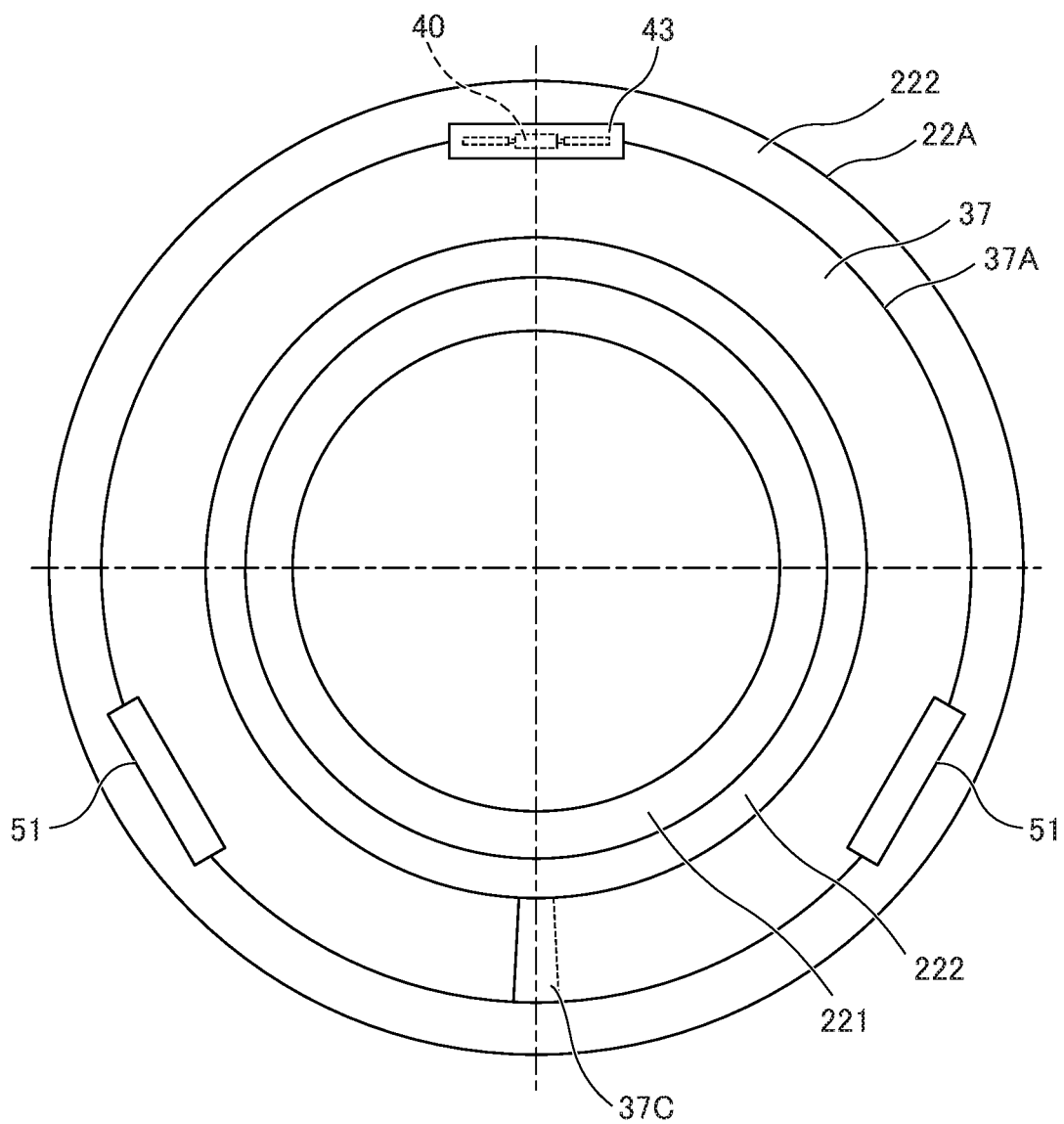
FIG. 12 is a view when looking at a bead filler, rubber sheet and protective member during a manufacturing process of the tire in FIG. 11 from an outer side in the tire-width direction.

FIG. 12 is a view when looking at the bead filler 22, rubber sheet 37 and protective member 43 during the manufacturing process of the tire 1 in FIG. 11 from an outer side in the tire-width direction. The rubber sheet 37 is pasted to the bead filler 22, and is formed in an annular shape by being joined at a joint part 37C. As shown in this drawing, the protective member covering the RFID tag 40 is pasted at the border region of the bead filler 222 and rubber sheet 37 of annular shape. In addition, as shown in FIG. 12, if considering to supplement joining of the bead filler 22 and rubber sheet 37, an additional rubber sheet 51 may be pasted at the border region of the second bead filler 222 and rubber sheet 37. There may be one of the additional rubber sheet 37, or may be two or more thereof. It is preferable for the protective member and additional rubber sheet 51 to be arranged at equal intervals. In the present embodiment, one of the protective member 43 and two of the additional rubber sheets 51 are arranged at 120° intervals. In addition, in the case of embedding a plurality of electronic units in the tire 1, the additional rubber sheet 51 may be established as a rubber sheet covering the electronic unit. The additional rubber sheet is preferably unvulcanized raw rubber when pasting, similarly to the protective member 43. The configuration pasting such an additional rubber sheet is applicable also in the first and second embodiments.

Figure 13:
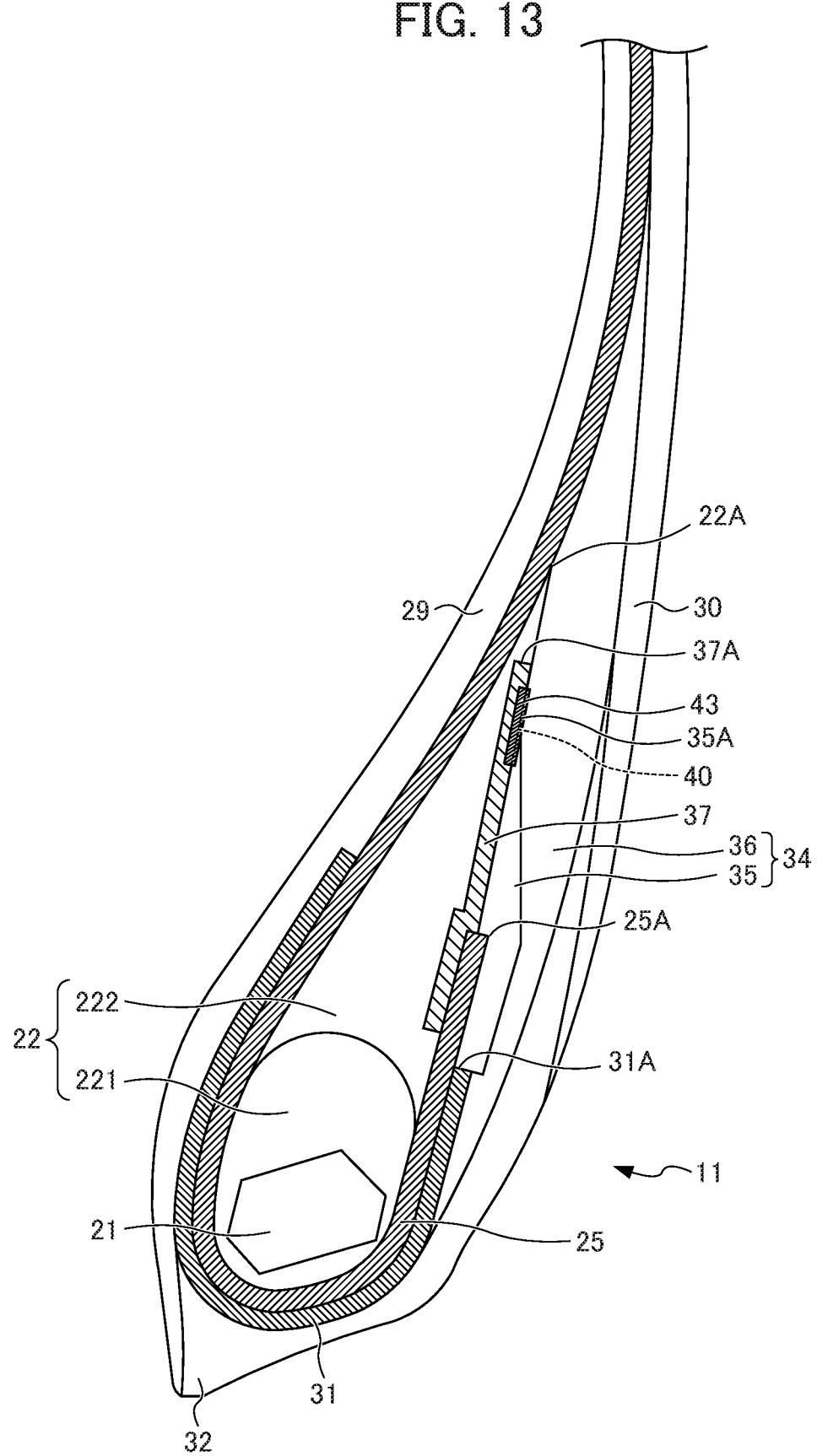
FIG. 13 is a partially enlarged cross-sectional view of a tire according to a third modified example of the third embodiment of the present invention.

Also in the third modified example shown in FIG. 13, the protective member 43 covering the RFID tag 40 is arranged at the intersecting position of at least three rubber members constituting the tire 1. More specifically, the tire 1 of the embodiment of the present modified example arranges at the intersecting position of the second pad 36, first pad 35 and rubber sheet 37. Then, in the present modified example, the protective member 43 covering the RFID tag 40 is arranged so as to straddle the second pad 36 and first pad 35, in the border region of the second pad 36 and first pad 35. In other words, the protective member is pasted so as to press down the tire-radial direction outside end 35A of the first pad 35 having a tire-radial direction outside end in a cross-sectional view in the tire-width direction that is a tapered shape. Then, with the protective member 43, the tire inner cavity side is covered by the rubber sheet 37. Even when arranging the RFID tag 40 at such a position, since the RFID tag 40 will be surrounded by a plurality of rubber members, i.e. the second pad 36, first pad and rubber sheet 37, the RFID tag 40 will hardly receive the influence of stress. Then, by defining the border region of the plurality of rubber members, the border region of the second pad 36 and first pad 35 in the present modified example, as a reference for the arrangement position of the RFID tag 40, the variation in the arrangement position of the RFID tag 40 decreases. The possibility of the RFID tag 40 being mistakenly arranged at an unpreferable position from an aspect of stress, distortion or the like also decreases, whereby it is possible to appropriately maintain the function of the RFID tag 40.

As shown in the results of the in-plane distribution simulation of strain energy in FIG. 8, the position at which arranging the RFID tag 40 becomes a region of mostly level 2, also in the modified examples of FIGS. 9 to 13, having little strain energy, and upon arranging the RFID tag 40, becomes a very preferable region.

According to the tire 1 of the present embodiment, the following effects are exerted in addition to the above (1), (2), and (4) to (7).

(9) In the tire 1 according to the present embodiment, the RFID tag 40 is arranged at the intersecting position of three rubber members including the second pad 36. The RFID tag 40 can thereby keep the function thereof, without being affected by excessive distortion.

Fourth Embodiment

Next, a tire according to a fourth embodiment will be explained while referencing FIGS. 14 to 20. It should be noted that, in the following explanation, the same reference number will be assigned for configurations which are the same as the first to third embodiments, and detailed explanations thereof will be omitted. The present embodiment is a particularly favorable embodiment in the case of the antenna of the RFID tag 40 being a coil-shaped spring antenna.

In the RFID tag 40 of the present embodiment, a coil-shaped spring antenna 421 having high communicability and flexibility can be used as the antenna. The spring antenna 421 is set to an antenna length which was optimized according to the frequency band, etc. to be used.

In the present embodiment, prior to interposing the RFID tag 40 by the two coating rubber sheets 431, 432 constituting the protective member 43, the rubber is arranged within the spring antenna 421. More preferably, rubber is filled into the spring antenna, so that air will not remain as much as possible. This process and the reason for adopting this process will be explained using FIGS. 14 to 20.

Figure 14:
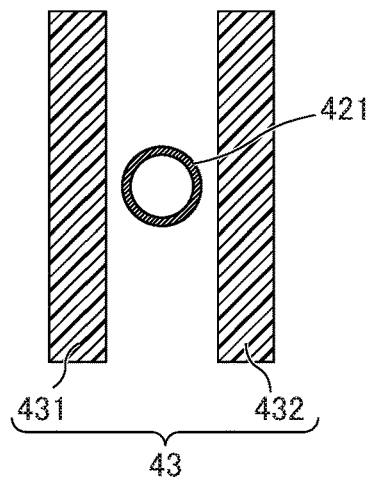
FIG. 14 is a view showing a cross section prior to interposing the RFID tag by rubber sheets, in a case of not filling rubber into a spring antenna.
Figure 15:
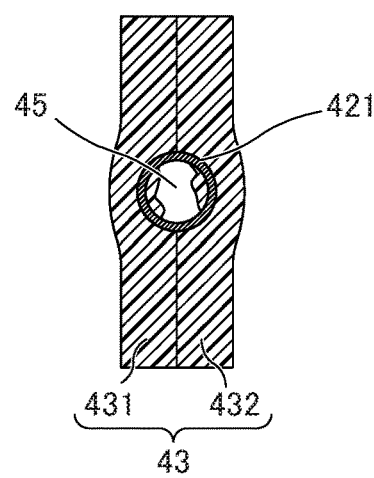
FIG. 15 is a view showing a cross section after interposing an RFID tag by rubber sheets, in a case of not filling rubber into a spring antenna.

First, the state in the vicinity of the RFID tag in the case of not filling rubber inside of the spring antenna 421 will be explained as a reference example using FIGS. 14 to 17. FIG. 14 is a view showing a cross section of the spring antenna 421 and coating rubber sheets 431, 432, prior to interposing the RFID tag 40 by the coating rubber sheets 431, 432. FIG. 15 is a view showing a cross section of the spring antenna 421, coating rubber sheets 431, 432, after interposing the RFID tag 40 by the coating rubber sheets 431, 432.

As shown in FIG. 15, in this reference example, since rubber is not filled into the spring antenna 421 in advance, a certain amount of air 45 may remain within the spring antenna 421 after interposing by the coating rubber sheets 431, 432. If air remains in this way, the integrity of the coating rubber sheets 431, 432 and the spring antenna 421 becomes insufficient, and when the tire deforms, there is concern over the spring antenna 421 not following the motion of the rubber, and the RFID tag 40 having the spring antenna 421 being damaged.

It should be noted that raw rubber before vulcanization is used as the coating rubber sheets 431, 432 herein. Consequently, by pushing the coating rubber sheets 431, 432 from both sides, the coating rubber sheets 431, 432 stick to some extent inside the spring antenna as shown in FIG. 15. However, very large amounts of time and labor are required in order to stick the coating rubber sheets 431, 432 until the inside of the spring antenna is completely embedded.

Figure 16:
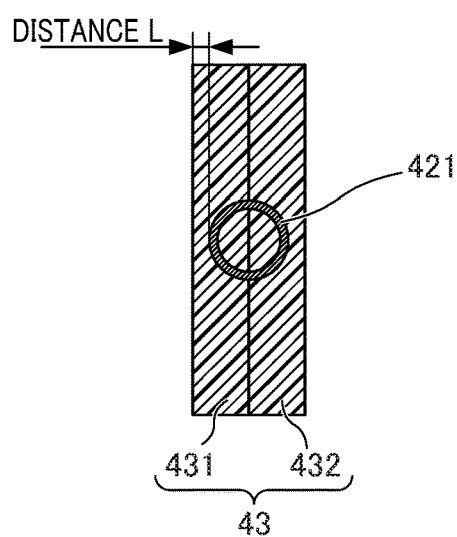
FIG. 16 is a view showing a cross section after interposing an RFID tag by rubber sheets, in a case of not filling rubber into a spring antenna.

Then, even if assuming a case of taking time and sticking the rubber sheets until the inside of the spring antenna is embedded, the distance L between the outer circumferential part of the spring antenna 421 and the outer surface of the coating rubber sheets 431, 432 becomes very short, as shown in FIG. 16. In addition, it is difficult to stabilize this distance L, and locally thin portions can occur. Consequently, the protection of the RFID tag 40 by the coating rubber sheets 431, 432 becomes insufficient, and during vulcanization, there is a possibility of the coating rubber sheets 431, 432 being damaged.

Therefore, in the present embodiment, prior to interposing the RFID tag 40 by the coating rubber sheets 431, 432, the rubber is arranged within the spring antenna 421, as shown in FIGS. 17 to 20. More preferably, rubber is filled within the spring antenna so that air does not remain as much as possible. It should be noted that the views shown on the right sides of FIGS. 17 to 20 are views showing a transverse section of the spring antenna 421 and the surrounding thereof.

Figure 17:
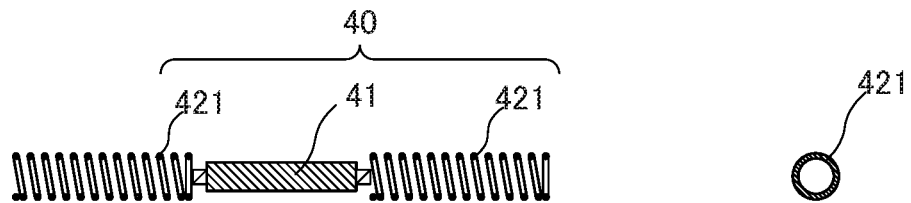
FIG. 17 is a view showing an RFID tag prior to filling rubber into a spring antenna, in a tire according to a fourth embodiment of the present invention.
Figure 18:
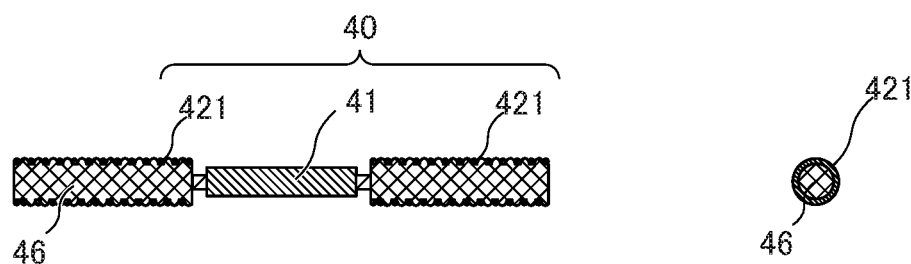
FIG. 18 is a view showing an RFID tag after filling rubber into a spring antenna, in the tire according to the fourth embodiment of the present invention.

FIG. 17 is a view showing a state prior to filling the rubber 46 into the spring antenna 421, and FIG. 18 is a view showing a state after filling the rubber 46 into the spring antenna 421. The rubber 46 is embedded so as to be almost the same outside diameter as the outer circumferential face of the spring antenna 421. Then, in the case of the rubber 46 escaping from the outer circumferential face of the spring antenna 421, it is preferable to wipe off this portion. In other words, the outer circumferential face of the rubber 46 is preferably molded so as to become substantially the same surface as the outer circumferential face of the spring antenna 421. It should be noted that the rubber 46 may be filled into the spring antenna 421, and the outer circumference of the spring antenna 421 may be thinly wrapped by the rubber 46. On the other hand, if thickly wrapping the spring antenna 421 by the rubber 46, in addition to the flexibility of the spring antenna 421 being harmed, the dimension in the width direction formed by the coating rubber sheets 431, 432 after interposing the RFID tag 40 becomes larger, which is not preferable. It should be noted that the rubber 46 may be embedded so as to become substantially the same outside diameter as the inner circumferential face of the spring antenna 421. It is desirable for the outer circumferential part of the rubber 46 to be located within the range of the inner circumferential face and outer circumferential face of the spring antenna 421.

Herein, rubber having flexibility is used as the rubber 46 in order to ensure the flexibility of the spring antenna 421. However, it is preferable to use rubber of a modulus higher than the coating rubber sheets 431, 432 as the rubber 46, in consideration of the workability, etc. It should be noted that preferably unvulcanized rubber is used as the rubber arranged within the spring antenna 421. By establishing the rubber 46 and coating rubber sheets 431, 432 as unvulcanized rubber and vulcanizing simultaneously, the integrity of the rubber 46, coating rubber sheets 431, 432 and spring antenna 421 rises. In addition, the rubber 46, and coating rubber sheets 431, 432 are more preferably established as the same type of rubber. It should be noted that, by emphasizing the flexibility of the spring antenna 421, rubber of lower modulus than the coating rubber sheets 431, 432 may be used as the rubber 46. In addition, rubber of substantially the same modulus, and rubber of the same material may be used. It should be noted that vulcanized rubber may be used as the rubber 46 arranged within the spring antenna 421. In addition, rubber-based adhesive, rubber-based filler, etc. can also be used. Taking account of configuring so as not to leave air within the spring antenna 421 as much as possible, while ensuring flexibility, it is possible to adopt various rubber-based materials. As the arranging operation of the rubber 46, various methods can be adopted; however, for example, it is also possible to inject rubber into the spring antenna 421 using a syringe. In this case, a set appropriate amount of the rubber 46 may be filled using a syringe. In addition, after filling a large amount of the rubber 46, portions protruding from the outer circumference of the spring antenna 421 may be wiped off.

Figure 19:
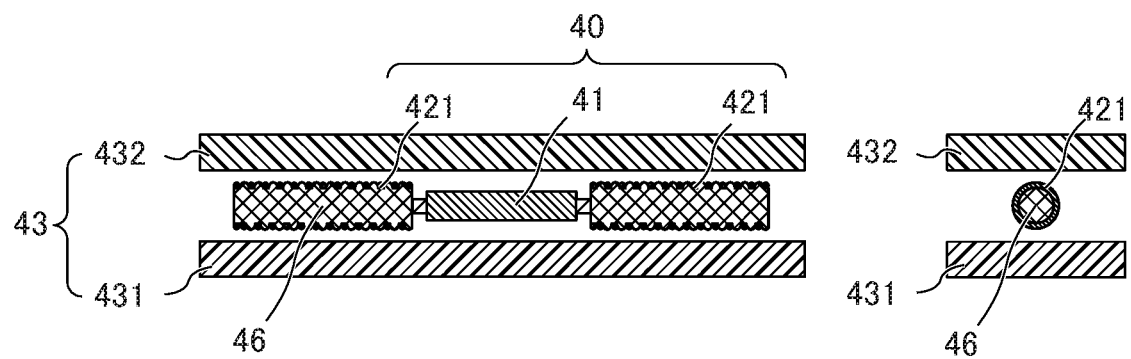
FIG. 19 is a view showing the RFID tag prior to interposing by rubber sheets, in the tire according to the fourth embodiment of the present invention.
Figure 20:
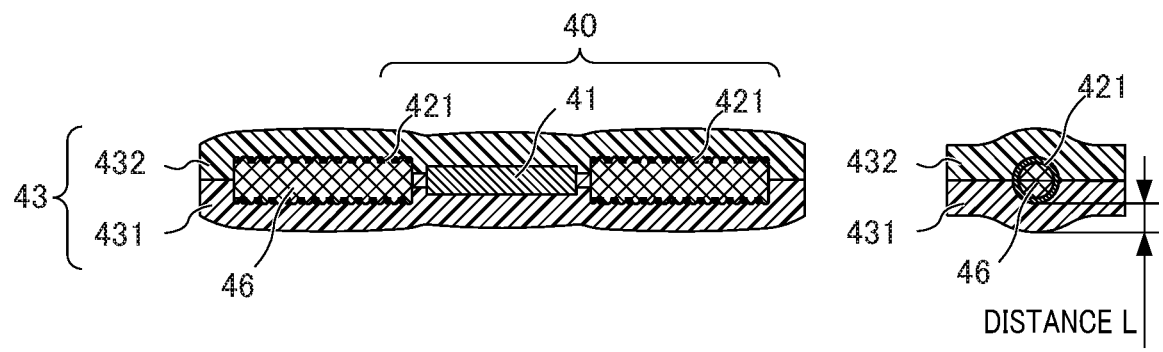
FIG. 20 is a view showing the RFID tag interposed by rubber sheets, in the tire according to the fourth embodiment of the present invention.

FIG. 19 is a view showing a state prior to interposing the RFID tag 40 into which the rubber 46 is filled in the spring antenna 421, by the coating rubber sheets 431, 432, and FIG. 20 is a view showing a state after interposing by the coating rubber sheets 431, 432.

As shown in FIG. 20, according to the present embodiment, since the rubber 46 is filled in advance into the spring antenna 421, no air pockets exist between the coating rubber sheets 431, 432. Consequently, since it is unnecessary to be concerned over air pockets, the process of interposing the RFID tag 40 by the coating rubber sheets 431, 432 also becomes easy. In addition, by the rubber 46 being arranged within the spring antenna 421, the integrity of the spring antenna 421, rubber 46, and coating rubber sheets 431, 432 rises, and when the tire deforms, the spring antenna 421 follows the movement of the rubber. Consequently, the durability of the RFID tag 40 having the spring antenna 421 also improves.

In addition, according to the present embodiment, the distance L between the outer circumferential part of the spring antenna 421 and the outer circumferential face of the coating rubber sheets 431, 432 stabilizes. In other words, a distance close to the thickness of the coating rubber sheets 431, 432 is generally secured as this distance L. Consequently, the RFID tag 40 is sufficiently protected by the coating rubber sheets 431, 432. In the present embodiment, the RFID tag 40 interposed by the coating rubber sheets 431, 432 is fixedly set between rubber members, and subsequently, the green tire is vulcanized.

It should be noted that, in the present embodiment, the RFID tag 40 in which rubber 46 is filled in advance into the spring antenna 421 is covered by the coating rubber sheets 431, 432, and then arranged between rubber members. However, the RFID tag 40 in which rubber 46 is filled in advance into the spring antenna 421 may be arranged between rubber members without covering by the coating rubber sheets 431, 432. By arranging the uncovered RFID tag 40 directly between the rubber members in this way, the fluctuation in thickness of the rubber member at a portion interposing the RFID tag 40 decreases, and thus the uniformity of the tire 1 improves. In addition, since the rubber 45 is filled in advance into the spring antenna 421, the rubber sheet 37 will not excessively sink into the spring antenna.

According to the tire of the present embodiment, the following effects are exerted in addition to the above (1) to (10).

(11) In the present embodiment, the RFID tag 40 as an electronic unit having a communication function has the spring antenna 421, and a step is included of arranging the rubber 46 in the spring antenna 421, prior to the step of pasting the RFID tag 40 to a rubber member. Upon the step of interposing the spring antenna 421 of the RFID tag 40 between rubber members, since it becomes unnecessary to be concerned over air pockets, the assembly property becomes favorable.

(12) The present embodiment provides a step of arranging the rubber 46 within the spring antenna 421 of the RFID tag 40 serving as an electronic unit having a communication function; a step of interposing the RFID tag 40 having the spring antenna 421 into which the rubber 46 was arranged, by the coating rubber sheets 431, 432, and an arrangement step of arranging the RFID tag 40 interposed by the coating rubber sheets 431, 432 between rubber members. The air 45 will thereby not remain inside the spring antenna 421. In addition, since it is unnecessary to be concerned about air pockets, the work of interposing the RFID tag 40 by the coating rubber sheets 431, 432 also becomes simple. In addition, since the distance L between the outer circumferential part of the spring antenna 421 and the outer surface of the rubber sheets 431, 432 is stabilized, the RFID tag 40 is sufficiently protected by the coating rubber sheets 431, 432.

(13) The present embodiment includes: a step of arranging the rubber 46 within the spring antenna 421 of the RFID tag 40 serving as an electronic unit having a communication function; and a step of pasting the rubber sheet 37 to the bead filler 22 so as to interpose the uncoated RFID tag 40 between rubber members. By interposing the uncoated electronic unit directly between rubber members in this way, the fluctuation in thickness of the rubber member at the portion interposing the RFID tag 40 decreases, and thus the uniformity of the tire improves. In addition, since the rubber 46 is filled in advance into the spring antenna 421, the rubber sheet 37 will not excessively sink into the spring antenna.

In addition, tire 1 according to embodiments of the present invention also includes the following configuration. A tire 1 according to a first aspect of the present invention includes: tire frame members including bead cores 21, a bead filler 22, an inner liner 29, side-wall rubber 30 and cushion rubber 34, 38; and an electronic unit 40 provided at an interface of tire frame members, the tire 1 further including: a carcass ply 23 which extends from one bead core 21 to another bead core 21 and includes a rubber-coated reinforcement cord, a belt 26 disposed on the outer side in the tire-radial direction of the carcass ply 23, in which the cushion rubber 34, 38 is disposed at an end of the carcass ply 23 or at an end of the belt 26, in which the side-wall rubber 30 is disposed on an outer side in a tire-width direction of the cushion rubber 34, 38, and in which the electronic unit 40 is disposed between the cushion rubber 34, 38, and the bead filler 22 or the side-wall rubber 30.

According to a second aspect of the present invention, in the tire as described in the first aspect, further including an annular-shaped sheet 37 extending in a tire-circumferential direction so as to make contact with a folding end of the carcass ply 23, in which the cushion rubber 34 is disposed on an outer side in the tire-radial direction of the folding end of the carcass ply 23, and in which the electronic unit is disposed on an outer side in the tire-radial direction of the annular-shaped sheet 37, between the bead filler 22 and the cushion rubber 34.

According to a third aspect of the present invention, in the tire as described in the second aspect, the cushion rubber 34 includes a first cushion rubber 35 which makes contact with the folding end of the carcass ply 23, and a second cushion rubber 36 which makes contact with the first cushion rubber 35 and extends to an outer side in the tire-radial direction, and in which the electronic unit 40 is disposed at an interface between the first cushion rubber 35 and the second cushion rubber 36.

According to a fourth aspect of the present invention, in the tire as described in the third aspect, a modulus of the first cushion rubber 35 is higher than a modulus of the second cushion rubber 36.

According to a fifth aspect of the present invention, in the tire as described in the first aspect, the carcass ply 23 is folded back to an outer side in the tire-width direction around the bead core 21, an annular-shaped sheet 37 extending in a circumferential direction is disposed at a folding end of the carcass ply 23, and the electronic unit 40 is disposed to be adjacent to the annular-shaped sheet 37.

According to a sixth aspect of the present invention, in the tire as described in the fifth aspect, the cushion rubber 34 is provided so as to extend to an outer side in the tire-radial direction of the folding end of the carcass ply 23 so as to be adjacent to the annular-shaped sheet 37, and wherein at least part of the electronic unit 40 is disposed between the cushion rubber 34 and an outer side in the tire-radial direction of the annular-shaped sheet 37.

According to a seventh aspect of the present invention, in the tire as described in the sixth aspect, the electronic unit 40 further makes contact with the bead filler 22.

According to an eighth aspect of the present invention, in the tire as described in the fifth aspect, the cushion rubber 34 includes a first cushion rubber 35 which covers the folding end of the carcass ply 23, and a second cushion rubber 36 which extends from the first cushion rubber 35 to an outer side in the tire-radial direction, and in which the electronic unit 40 is disposed so as to make contact with an interface between the first cushion rubber 35 and the second cushion rubber 36.

According to a ninth aspect of the present invention, in the tire as described in the fifth aspect, at least part of the electronic unit 40 is coated with rubber.

According to a tenth aspect of the present invention, in the tire as described in the first aspect, the electronic unit 40 is disposed between the cushion rubber 34 extending from a folding end of the carcass ply 23 to an outer side in the tire-radial direction, and the side-wall rubber 30 provided adjacent to an outer side in the tire-width direction of the cushion rubber 34.

According to an eleventh aspect of the present invention, in the tire as described in the first aspect, the belt 26 is at least one layer of a steel belt 26 configured from rubber-coated steel cord, in which the cushion rubber 38 is provided between a tire-width direction end of the steel belt 26 and the carcass ply 23, and in which the electronic unit 40 is disposed between the cushion rubber 38 and the side-wall rubber 30.

According to a twelfth aspect of the present invention, in the tire as described in the eleventh aspect, the cushion rubber 38 is a substantially triangular shape in a cross-sectional view and extends from within the width of the steel belt 26 to the outside of the tire width direction, in which the electronic unit is provided on the outer slope of the cushion rubber 38 in the tire width direction.

According to a thirteenth aspect of the present invention, in the tire as described in the eleventh aspect, further including tread rubber 28 on an outer side in the tire-radial direction of the steel belt 26, in which the electronic unit 40 is disposed so as to make contact with the tread rubber 28.

According to a fourteenth aspect of the present invention, in the tire as described in the eleventh aspect, further including tread rubber 28 on an outer side in the tire-radial direction of the steel belt 26, in which the electronic unit 40 is disposed so as to make contact with at least two among the tread rubber 28, the cushion rubber 38 and the side-wall rubber 30.

According to a fifteenth aspect of the present invention, in the tire as described in the eleventh aspect, further comprising tread rubber 28 on an outer side in the tire-radial direction of the steel belt 26, in which the electronic unit 40 is disposed at an intersecting position of the tread rubber 28, the cushion rubber 38 and the side-wall rubber 30.

It should be noted that, although the tire of the present invention can be adopted as various types of tires such as for cars, light trucks, trucks and buses, it is particularly suitable as a tire of a truck, bus, etc. It should be noted that the present invention is not to be limited to the above-mentioned embodiments, and that even when carrying out modifications, improvements, etc. within a scope capable of achieving the object of the present invention, it is encompassed by the scope of the present invention.

What is claimed is:
1. A tire comprising:
tire frame members including bead cores;
a bead filler;
an inner liner;
side-wall rubber;
an electronic unit provided at an interface of the tire frame members
a carcass ply which extends from one bead core to another bead core and includes a rubber-coated reinforcement cord;

cushion rubber, disposed on an outer side in a tire-radial direction of a folding end of the carcass ply, wherein the cushion rubber includes a first cushion rubber which makes contact with the folding end of the carcass ply, a second cushion rubber which makes contact with the first cushion rubber and extends to the outer side in the tire-radial direction, a modulus of the first cushion rubber is higher than a modulus of the second cushion rubber, and the electronic unit is disposed at an interface between the first cushion rubber and the second cushion rubber;

an annular-shaped sheet extending in a tire-circumferential direction so as to make contact with the folding end of the carcass ply, wherein the electronic unit is disposed on the outer side in the tire-radial direction of the annular-shaped sheet, between the bead filler and the cushion rubber; and a belt disposed on the outer side in the tire-radial direction of the carcass ply, wherein the cushion rubber is disposed at the folding end of the carcass ply, and the side-wall rubber is disposed on an outer side in a tire-width direction of the cushion rubber.

2. The tire according to claim 1, wherein the carcass ply is folded back to the outer side in the tire-width direction around the bead core and the electronic unit is disposed to be adjacent to the annular-shaped sheet.

3. The tire according to claim 2, wherein the cushion rubber is provided so as to extend to the outer side in the tire-radial direction of the folding end of the carcass ply so as to be adjacent to the annular-shaped sheet, and at least part of the electronic unit is disposed between the cushion rubber and the outer side in the tire-radial direction of the annular-shaped sheet.

4. The tire according to claim 3, wherein the electronic unit further makes contact with the bead filler.

5. The tire according to claim 2, wherein the first cushion rubber covers the folding end of the carcass ply and the electronic unit is disposed so as to make contact with the interface between the first cushion rubber and the second cushion rubber.

6. The tire according to claim 2, wherein at least part of the electronic unit is coated with rubber.

* * * * *